United States Patent
Sun et al.

(10) Patent No.: US 12,133,271 B2
(45) Date of Patent: Oct. 29, 2024

(54) FRAME BASED EQUIPMENT (FBE) STRUCTURE FOR NEW RADIO-UNLICENSED (NR-U)

(71) Applicant: QUALCOMM Incorporated, San Diego, CA (US)

(72) Inventors: Jing Sun, San Diego, CA (US); Ananta Narayanan Thyagarajan, Bangalore (IN); Kapil Bhattad, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/755,565

(22) PCT Filed: Nov. 4, 2020

(86) PCT No.: PCT/US2020/058970
§ 371 (c)(1),
(2) Date: May 2, 2022

(87) PCT Pub. No.: WO2021/092082
PCT Pub. Date: May 14, 2021

(65) Prior Publication Data
US 2022/0295575 A1    Sep. 15, 2022

(30) Foreign Application Priority Data
Nov. 8, 2019 (IN) .............................. 201941045474

(51) Int. Cl.
*H04W 74/0833* (2024.01)
*H04W 24/08* (2009.01)
(Continued)

(52) U.S. Cl.
CPC ....... *H04W 74/0841* (2013.01); *H04W 24/08* (2013.01); *H04W 72/0446* (2013.01); *H04W 74/006* (2013.01); *H04W 74/0866* (2013.01)

(58) Field of Classification Search
CPC .......... H04W 74/0841; H04W 74/006; H04W 74/0866; H04W 72/0446; H04W 24/08
(Continued)

(56) References Cited

U.S. PATENT DOCUMENTS

2018/0176944 A1    6/2018  Wang et al.
2019/0335500 A1*  10/2019 Zhang ................... H04W 72/23
(Continued)

FOREIGN PATENT DOCUMENTS

CN    109688626 A    4/2019
WO    2020125121 A1  6/2020

OTHER PUBLICATIONS

Convida Wireless: "Channel Access Procedures for NR Unlicensed for FBE", 3GPP TSG-RAN WG1 #98bis, R1-1911332, Oct. 20, 2019, pp. 1-5, Oct. 14, 2019-Oct. 20, 2019, Section 2.
(Continued)

*Primary Examiner* — Peter G Solinsky
(74) *Attorney, Agent, or Firm* — QUALCOMM Incorporated

(57) ABSTRACT

Wireless communications systems and methods related frame based equipment (FBE) communications in a wireless communication network are provided. A user equipment (UE) receives, from a base station (BS), system information including a frame based equipment (FBE) configuration indicating a plurality of frame periods. Each frame period of the plurality of frame periods includes a gap period, where a start or an end of the gap period of a first frame period of the plurality of frame periods is aligned to a beginning of a
(Continued)

radio frame. The UE communicates, with the BS, a communication based on the FBE configuration.

66 Claims, 13 Drawing Sheets

(51) Int. Cl.
  *H04W 72/0446* (2023.01)
  *H04W 74/00* (2009.01)
  *H04W 74/08* (2024.01)
(58) Field of Classification Search
  USPC .......................................................... 370/329
  See application file for complete search history.

(56) References Cited

U.S. PATENT DOCUMENTS

| | | | |
|---|---|---|---|
| 2019/0342045 A1 | 11/2019 | Radulescu et al. | |
| 2019/0349154 A1 | 11/2019 | Tsai et al. | |
| 2019/0350039 A1 | 11/2019 | June et al. | |
| 2019/0373636 A1* | 12/2019 | Yerramalli | H04W 80/02 |
| 2021/0014891 A1* | 1/2021 | Talarico | H04W 72/1273 |
| 2022/0103232 A1* | 3/2022 | Zhou | H04W 76/19 |

OTHER PUBLICATIONS

Taiwan Search Report—TW109138701—TIPO—Mar. 22, 2024.
International Search Report and Written Opinion—PCT/US2020/058970—ISA/EPO—Feb. 2, 2021.

* cited by examiner

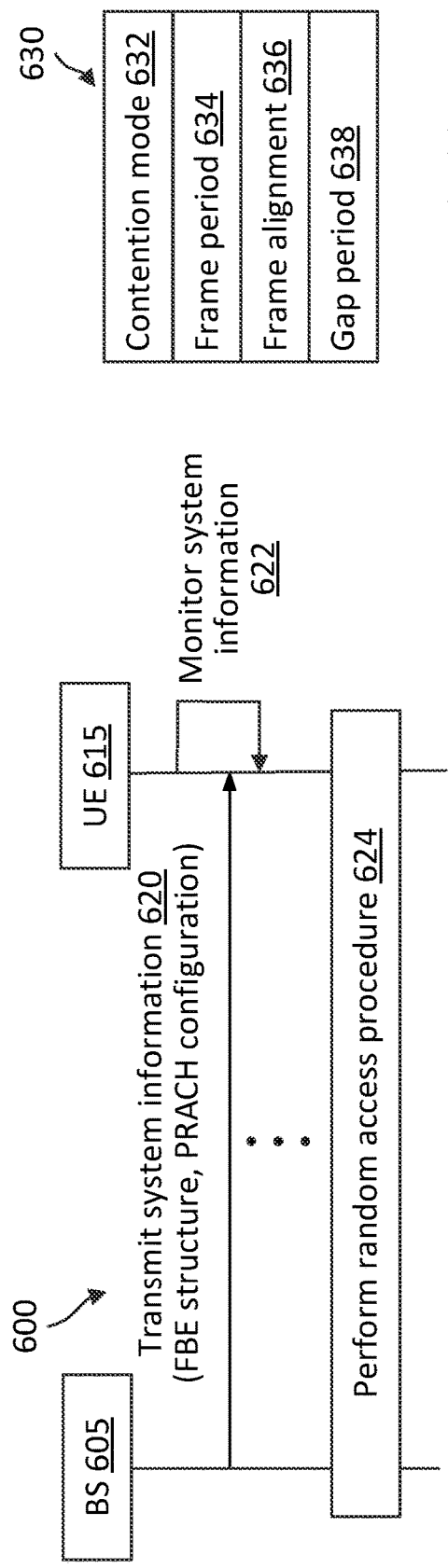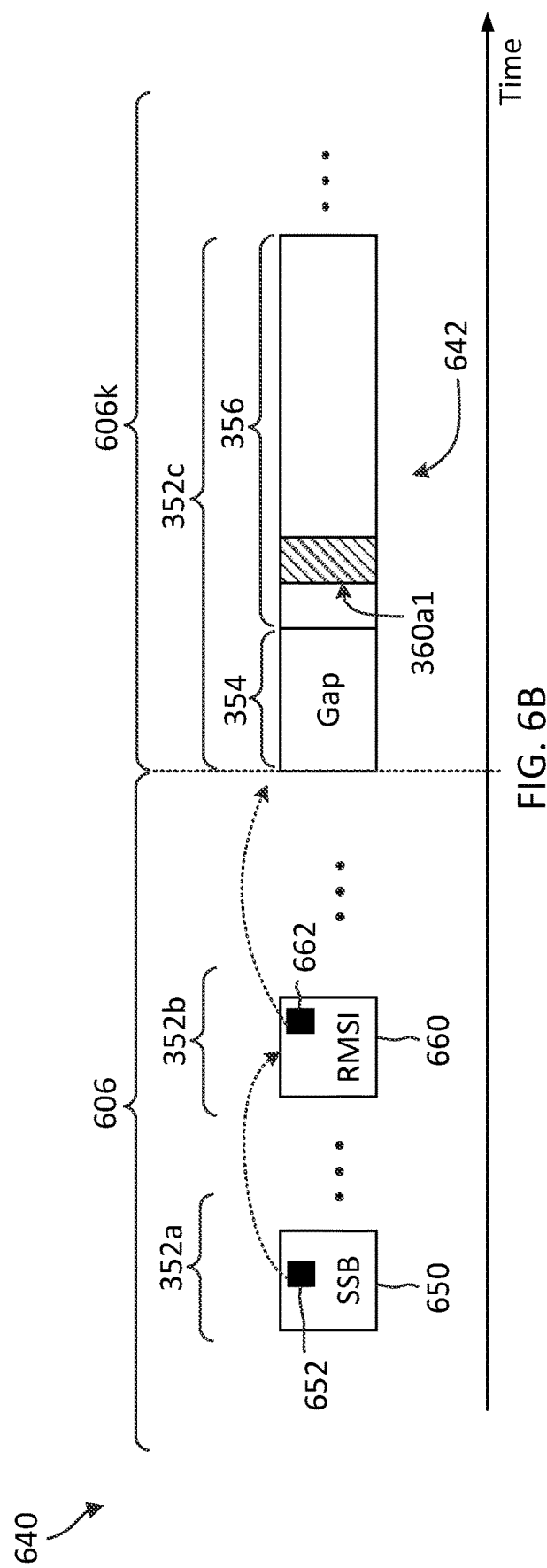

FRAME BASED EQUIPMENT (FBE) STRUCTURE FOR NEW RADIO-UNLICENSED (NR-U)

CROSS REFERENCE TO RELATED APPLICATIONS

The present application is a 35 U.S.C. 371 National Phase entry of Patent Cooperation Treaty (PCT) Application No. PCT/US2020/058970, filed Nov. 4, 2020. The present application further claims priority to and the benefit of Indian Provisional Patent Application No. 201941045474, filed Nov. 8, 2019, and Taiwanese Patent Application No. 109138701, filed Nov. 5, 2020. The aforementioned applications are hereby expressly incorporated herein by reference in their entireties and for all applicable purposes.

TECHNICAL FIELD

This application relates to wireless communication systems, and more particularly to frame based equipment (FBE) communications in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a BS may schedule a UE for an UL transmission in an unlicensed frequency band. The UE may perform an LBT procedure prior to the scheduled time. When the LBT is a success, the UE may proceed to transmit UL data according to the schedule. When the LBT fails, the UE may refrain from transmitting.

There are two types of LBT procedures, a frame based equipment (FBE)-based LBT and a load based equipment (LBE)-based LBT. In FBE-based LBT, channel sensing is performed at predetermined time instants. For instance, if the channel is busy, a transmitting node may back off for a predetermined time period and sense the channel again after this period. In LBE-based LBT, channel sensing is performed at any time instant and random back-off is used if the channel is found busy.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes receiving, by a user equipment (UE) from a base station (BS), system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and communicating, by the UE with the BS, a communication based on the FBE configuration.

In an additional aspect of the disclosure, a method of wireless communication, includes transmitting, by a base station (BS), system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and communicating, by the BS with a UE, a communication based on the FBE configuration.

In an additional aspect of the disclosure, a user equipment (UE) includes a transceiver configured to receive, from a base station (BS), system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and communicate, with the BS, a communication based on the FBE configuration.

In an additional aspect of the disclosure, a base station (BS) includes a transceiver configured to transmit system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and communicate, with a UE, a communication based on the FBE configuration.

In an additional aspect of the disclosure, a user equipment (UE) includes means for receiving, from a base station (BS), system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and means for communicating, with the BS, a communication based on the FBE configuration.

In an additional aspect of the disclosure, a base station (BS) includes means for transmitting system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and means for communicating, with a UE, a communication based on the FBE configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6A is a signaling diagram of an FBE communication method according to some aspects of the present disclosure.

FIG. 6B is a timing diagram illustrating an FBE structure signaling scheme according to some aspects of the present disclosure.

FIG. 6C illustrates an exemplary FBE structure message according to some aspects of the present disclosure.

DETAILED DESCRIPTION

Figure 1:
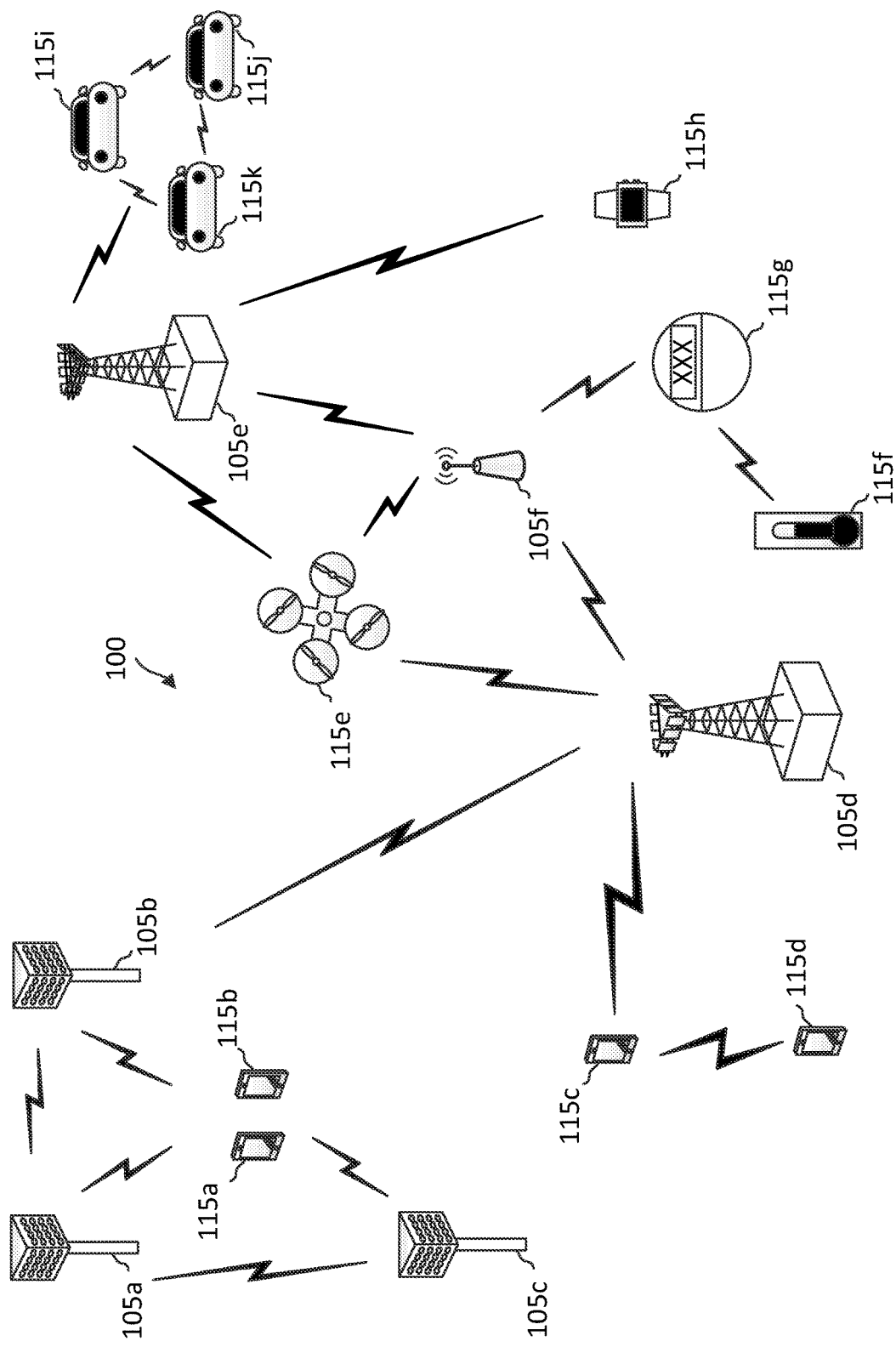
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for signaling FBE structure for communications over a shared radio frequency band. For example, a BS may transmit a system information signal, such as a physical broadcast channel (PBCH) signal or a remaining system information (RMSI) signal, to indicate an FBE configuration for communicating over the shared radio frequency band. The FBE configuration may indicate a plurality of frame periods shared by a plurality of wireless communication devices. Each frame period includes a gap period at the beginning of the frame period. The frame periods may be referred to as fixed frame periods (FFPs). The gap period may be used for contention. For instance, the BS may perform an LBT during the contention period. Upon a successful LBT, the BS may use the non-gap portion of the frame period for UL and/or DL communications with a user equipment (UE).

In some aspects, the system information signal may indicate either an FBE contention mode or a load based equipment (LBE) contention mode. The FBE configuration may indicate a duration of the frame period, a duration of the gap period, a frame boundary alignment between the frame periods and radio frames. In some instances, the FBE configuration may indicate the duration of the gap period in units of symbols or slots. In some instances, the FBE configuration may not signal the duration of the gap period. Instead, the duration of the gap period may be computed based on the duration of the frame period and a minimum duration of the gap period with respect to the frame period. In some instances, the FBE configuration may indicate a number of symbols or slots for the gap period in addition to the minimum duration.

In some aspects, the system information signal may indicate a physical random access channel (PRACH) configuration. In some instances, the PRACH configuration may indicate that a UE may transmit a PRACH signal during a frame period acquired by the BS. In some instances, the PRACH configuration may indicate that a UE may transmit a PRACH signal during any gap period based on a successful contention. In some instances, the PRACH configuration may indicate that a UE may autonomously transmit a PRACH signal during any time based on reference channel occupancy duration parameter (e.g., regulated by authority). In some instances, the PRACH configuration may indicate that a UE may contend for a frame period for transmitting a PRACH signal and may share the acquired frame period with the BS.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything(V2X), cellular-V2X (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding.

The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. In some aspects, the network 100 may utilize an FBE-based contention scheme for sharing a radio channel among multiple BSs 105 and/or UEs 115 of different network operating entities and/or different radio access technologies (RATs). As explained above, in FBE-based LBT, channel sensing is performed at predetermined time instants (without random backoff as in LBE-based LBT). Accordingly, FBE-based channel access may have a lower implementation complexity compared to LBE-based channel access. Additionally, FBE-based channel access may be suitable for use in a synchronous system or an isolated deployment.

Figure 2:
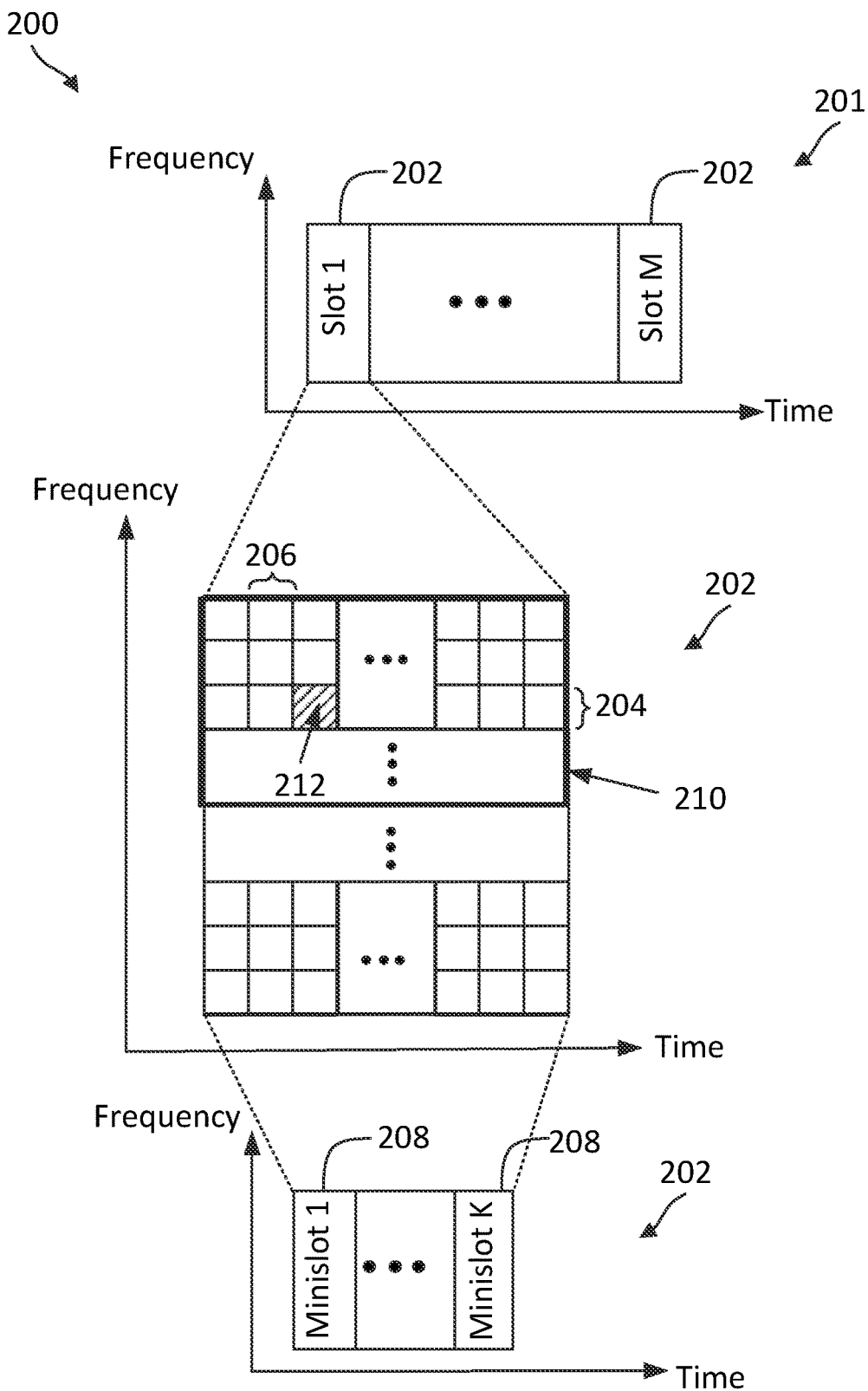
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3A:
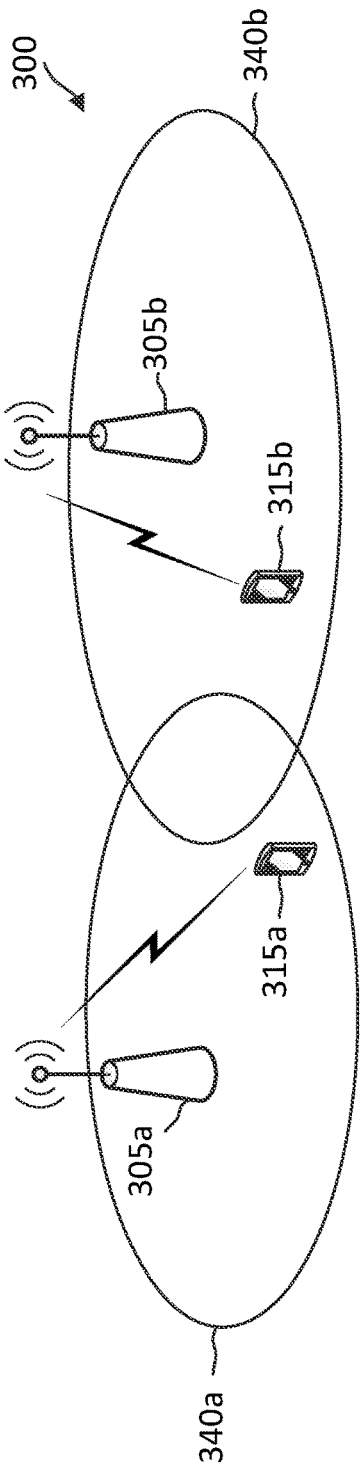
FIG. 3A illustrates an example of a wireless communications network that supports medium sharing across multiple network operating entities according to some aspects of the present disclosure.
Figure 3B:
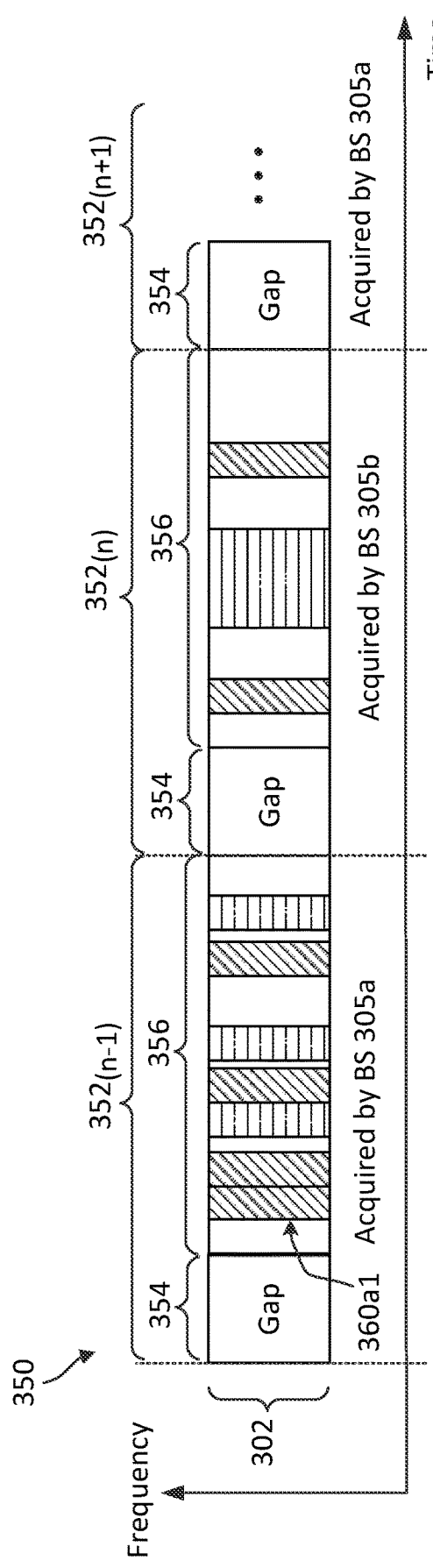
FIG. 3B illustrates a frame based equipment (FBE) communication scheme according to some aspects of the present disclosure.

FIGS. 3A and 3B collectively illustrate FBE-based communications over a radio frequency channel (e.g., in a shared radio frequency band or an unlicensed band) for communication. FIG. 3A illustrates an example of a wireless communications network 300 that supports medium sharing across multiple network operating entities according to some aspects of the present disclosure. The network 300 may correspond to a portion of the network 100. FIG. 3A illustrates two BSs 305 (shown as BS 305*a* and BS 305*b*) and two UEs 315 (shown as UE 315*a* and UE 315*b*) for purposes of simplicity of discussion, though it will be recognized that aspects of the present disclosure may scale to many more UEs 315 and/or BSs 305. The BSs 305 and the UEs 315 may be similar to the BSs 105 and the UEs 115, respectively. FIG. 3B illustrates an FBE communication scheme 350 according to some aspects of the present disclosure. The BS 305 and the UE 315 may communicate with each other as shown in the scheme 350. In FIG. 3B, the x-axis represents time in some arbitrary units, and the y-axis represents frequency in some arbitrary units.

Referring to FIG. 3A, in the network 300, the BS 305*a* serves the UE 315*a* in a serving cell or a coverage area 340*a*, while the BS 305*b* serves the UE 315*b* in a serving cell or a coverage area 340*b*. The BS 305*a* and the BS 305*b* may communicate with the UE 315*a* and the UE 315*b* in the same frequency channel (e.g., the frequency band 302 of FIG. 3B), respectively. In some instances, the BS 305*a* and the BS 305*b* may be operated by different network operating entities. In some other instances, the BS 305*a* and the BS 305*b* may be operated by different network operating entities. In some instances, the BS 305*a* and the BS 305*b* may utilize the same RAT (e.g., NR-based technology or WiFi-based technology) for communications with the UE 315*a* and the UE 315*b*, respectively. In some other instances, the BS 305*a* and the BS 305*b* use different RATs for communications with the UE 315*a* and the UE 315*b*, respectively. For example, the BS 305*a* and the UE 315*a* may utilize an NR-based technology for communication, while the BS 305*b* and the UE 315*b* may utilize WiFi-based technology communication. In general, the BS 305*a* and the BS 305*b* may be operated by the same network operating entities or different network operating entities and may utilize the same RAT or different RATs for communications in the network 300. The BS 305*a*, the BS 305b, the UE 315a, and the UE 315b may share access to the channel using an FBE-based contention mode as shown in the FBE communication scheme 350.

Referring to FIG. 3B, the scheme 350 partitions the frequency band 302 into a plurality of frame periods 352 (shown as $352_{(n-1)}$, $352_{(n)}$, and $352_{(n+1)}$). Each frame period 352 includes a contention or gap period 354 and a transmission period 356. The frame period 352 may have a resource structure as shown in the radio frame structure 200. In some instances, each frame period 352 may include one or more slots similar to the slots 202. In some instances, each frame period 352 may include one or more symbols similar to the symbols 206. The starting time and the duration of the frame periods 352 and the gap periods 354 are predetermined. Additionally, each frame period 352 may have the same duration. Similarly, each gap period 354 may have the same duration. Thus, the frame periods 352 may also be referred to as FFPs. In some other instances, the frame periods 352 may be referred to as channel occupancy times (COTs). In some aspects, a gap period 354 may have a minimum duration of 5 percent (%) of the total time frame period 352 according to some regulations.

A node (e.g., the BS 305a or the BS 305b) interested in using a frame period 352 for communication may contend for the channel during the corresponding gap period 354, for example, by performing an LBT to determine whether another node may have reserved the same frame period 352. If the LBT is successful, the node may transmit an indication of a reservation for the frame period 352 so that other nodes may refrain from using the same frame period 352. The LBT can be based on energy detection or signal detection. The reservation indication can be a predetermine sequence or waveform or any suitable signal. If the LBT is unsuccessful, the node may back off until the start of a next gap period 354, where the node may attempt another contention during the gap period 354.

While FIG. 3B illustrates a gap period 354 located at the beginning of a frame period 352, in some instances, the gap period 354 can be located at the end of a frame period 352, where the gap period may be used for contention for a next frame period.

In the illustrated example of FIG. 3B, the BS 305a and the BS 305b may contend for the frame periods $352_{(n-1)}$, $352_{(n)}$, and $352_{(n+1)}$ during corresponding gap periods 354. The BS 305a may win the contention for the frame period $352_{(n-1)}$ and $352_{(n+1)}$, while the BS 305b may win the contention for the frame period $352_{(n)}$. After winning a contention, the BS 305a or the BS 305b may schedule DL communication 360 and/or UL communication 370 with the UE 315a or the UE 315b, respectively, within the corresponding non-gap duration or transmission period 356. The DL communication 360 may include DL control information (e.g., PDCCH control information) and/or DL data (e.g., PDSCH data). The UL communication 370 may include UL control information (e.g., PUCCH control information), PRACH signals, random access messages, periodic-sounding reference signals (p-SRSs), and/or UL data (e.g., PUSCH data). For instance, the BS 305a may transmit a DL scheduling grant (e.g., PDCCH scheduling DCI) or a UL scheduling grant (e.g., PDCCH scheduling DCI) for a DL communication 360 or a UL communication 370 with the UE 315a during the frame period $352_{(n-1)}$. The UE 315a may monitor for scheduling grants from the BS 305a and transmit UL communication 370 to the BS 305a or receive DL communication 360 from the BS 305a according to the grants.

In some aspects, the UE 315a may perform a category 2 (CAT2) LBT prior to transmitting the UL communication 370. A CAT2 LBT may refer to a one-shot LBT with no random backoff. The CAT2 LBT with no random backoff may allow the UE 315a to have a greater chance in gaining access to the channel.

In some aspects, the BS 305a may transmit a PDCCH signal (shown as 360a1) at the beginning of the transmission period 356 to signal to the UE 315a that the BS 305a has won the contention for the frame period $352_{(n-1)}$. In some instances, the PDCCH signal may include a group common-PDCCH (GC-PDCCH) DCI signaling to a group of UEs served by the BS 305a that the BS 305a has won the contention for the frame period $352_{(n-1)}$ so the UEs may monitor for PDCCH from the BS 305a. In some instances, the GC-PDCCH may include a slot format indication (SFI) indicating transmission directions assigned to symbols within the transmission period 356 of the frame period $352_{(n-1)}$. The indication of the BS 350a winning access to the frame period $352_{(n-1)}$ may generally be referred to as a COT indication.

Additionally, once the BS 305a or the BS 305b won the contention for a frame period 352, the frame period 352 is used exclusively by the BS 305a or the BS 305b who won the contention. Thus, the BS 305a or the BS 305b can leave an idle period (shown as blank boxes) with no transmission in the frame period 352. In the present example, when operating in the FBE mode, another node may not occupy the channel during the idle period since contention may only occur during the gap periods 354.

In some aspects, the BS 305a may configure the UE 315a with configured grants or configured resources for configured UL transmissions. The configured grants or resources may be periodic. When a configured resource or grant is within the transmission period 356 of the frame period $352_{(n-1)}$, the UE 315a may monitor for a COT indication from the BS 305a during the frame period $352_{(n-1)}$. Upon detecting a COT indication from the BS 305a, the UE 315a may transmit using the configured grant resource in the frame period $352_{(n-1)}$.

As discussed above, when operating in an FBE communication mode, the frame periods 352 and the gap periods 354 are predetermined and are known prior to communications in the FBE mode. Accordingly, the present disclosure provides techniques to signal FBE structures in broadcast system information for FBE communication over a shared radio frequency band. The present disclosure also provides techniques to enable UEs (e.g., the UEs 115 and/or 315) to access a network (e.g., the networks 100 and/or 300), for example, in a random access procedure, when the network operates in an FBE mode. The signaling of the FBE structure may allow a network to have the flexibility and/or control in determining the duration of the FBE frame periods 352 (the FFPs) and/or the duration of the gap periods 354. The signaling of the FBE structure via broadcast system information can allow any nodes or UEs within the reach of the BS to be aware of the FBE structure, and thus may initiate an access or transmission (e.g., a PRACH signal) to the BS based on the frame periods 352 and/or the gap periods 354.

Figure 4:
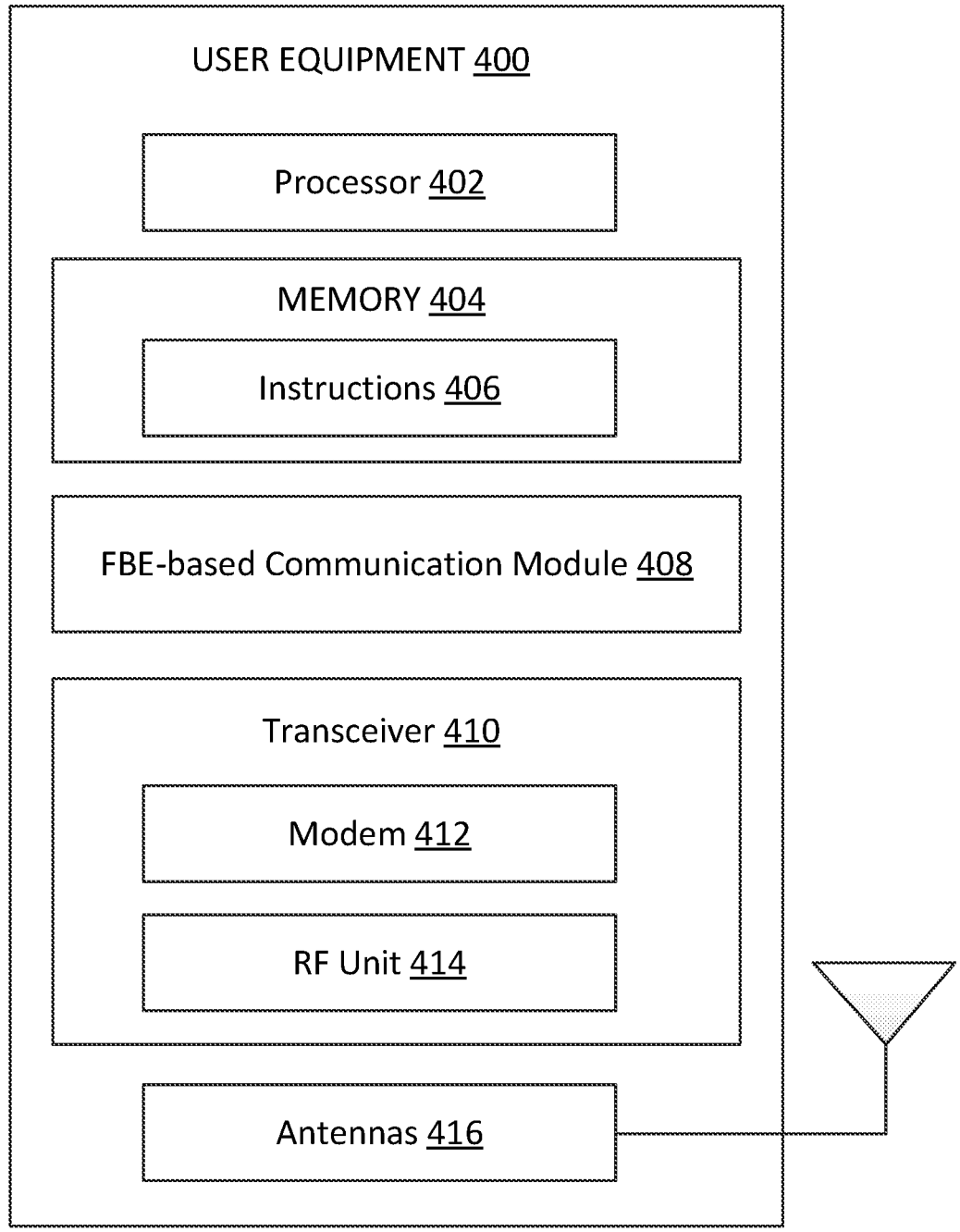
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1. As shown, the UE 400 may include a processor 402, a memory 404, an FBE-based communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 2, 3A-3B, 6A-6C, 7A-7D, 8, and 10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The FBE-based communication module 408 may be implemented via hardware, software, or combinations thereof. For example, the FBE-based communication module 408 may be implemented as a processor, circuit, and/or instructions 406 stored in the memory 404 and executed by the processor 402. In some instances, the FBE-based communication module 408 can be integrated within the modem subsystem 412. For example, the FBE-based communication module 408 can be implemented by a combination of software components (e.g., executed by a DSP or a general processor) and hardware components (e.g., logic gates and circuitry) within the modem subsystem 412.

The FBE-based communication module 408 may be used for various aspects of the present disclosure, for example, aspects of aspects of FIGS. 2, 3A-3B, 6A-6C, 7A-7D, 8, and 10. The FBE-based communication module 408 is configured to receive a system information signal from a BS (e.g., the BSs 105 and/or 305) indicating an FBE configuration and communicate UL communications (e.g., PUCCH and/or PUSCH) and/or DL communications (e.g., PDCCH and/or PDSCH) with the BS based on the FBE configuration.

In some aspects, the system information signal may indicate either an FBE contention mode or a load based equipment (LBE) contention mode. The FBE configuration may indicate a duration of the frame period, a duration of the gap period, and/or a frame boundary alignment between the frame periods and radio frames. In some instances, the FBE configuration may indicate the duration of the gap period in units of symbols or slots. In some instances, when the FBE configuration does not include a duration for the gap period, the FBE-based communication module 408 is configured to compute the duration for the gap period based on the duration of the frame period and a minimum duration of the gap period with respect to the frame period. In some instances, the FBE configuration may indicate a number of symbols or slots for the gap period in addition to the minimum duration.

In some aspects, the FBE configuration may indicate a duration of the frame period. The duration of the gap period may be omitted from the FBE configuration. For instance, the gap period can be a certain factor of the frame period, and thus may be computed based on the signaled frame period. Additionally, the frame boundary alignment may be omitted from the FBE configuration. For instance, the frame alignment between the radio frames and the frame periods can be predetermined (e.g., specified by a wireless communication protocol).

In some aspects, the system information signal may further indicate a physical random access channel (PRACH) configuration, and the FBE-based communication module 408 may be further configured to transmit a PRACH signal based on the PRACH configuration to initiate a random access procedure with the BS. In some instances, the PRACH configuration may indicate that a UE may transmit a PRACH signal during a frame period acquired by the BS. In some instances, the PRACH configuration may indicate that a UE may transmit a PRACH signal during any gap period based on a successful contention. In some instances, the PRACH configuration may indicate that a UE may autonomously transmit a PRACH signal during any time based on reference channel occupancy duration parameter (e.g., regulated by authority). In some instances, the PRACH configuration may indicate that a UE may contend for a frame period for transmitting a PRACH signal and may share the acquired frame period with the BS. Mechanisms for FBE communication are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the FBE-based communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH control information, PRACH signals, PUSCH data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., SSBs, RMSI, MIB, SIB, FBE configuration, PRACH configuration PDCCH, PDSCH) to the FBE-based communication module 408 for processing. The antennas 416 may include multiple antennas of similar or different designs in order to sustain multiple transmission links. The RF unit 414 may configure the antennas 416.

In an example, the transceiver 410 is configured to receive, from a BS, system information including an FBE configuration indicating a plurality of frame periods, each including a gap period for contention at the beginning of the frame period, and communicate with the BS based on the FBE configuration, for example, by coordinating with the FBE-based communication module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
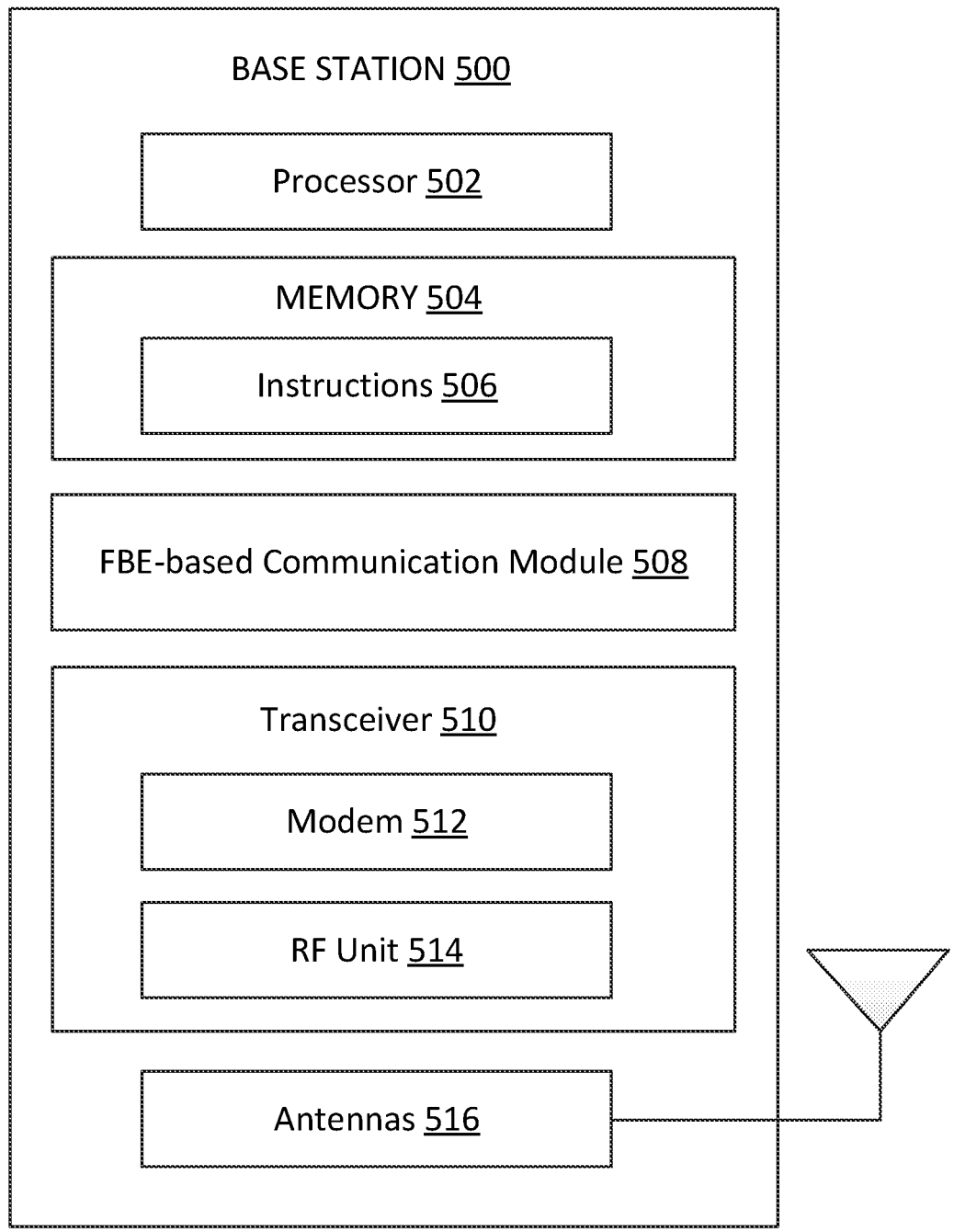
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1. As shown, the BS 500 may include a processor 502, a memory 504, an FBE-based communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2, 3A-3B, 6A-6C, 7A-7D, 8, and 9. Instructions 506 may also be referred to as code, which may be interpreted broadly to include any type of computer-readable statement(s) as discussed above with respect to FIG. 4.

The FBE-based communication module 508 may be implemented via hardware, software, or combinations thereof. For example, the FBE-based communication module 508 may be implemented as a processor, circuit, and/or instructions 506 stored in the memory 504 and executed by the processor 502. In some instances, the FBE-based communication module 508 can be integrated within the modem subsystem 512. For example, the FBE-based communication module 508 can be implemented by a combination of software components (e.g., executed by a DSP or a general processor) and hardware components (e.g., logic gates and circuitry) within the modem subsystem 512.

The FBE-based communication module 508 may be used for various aspects of the present disclosure, for example, aspects of aspects of FIGS. 2, 3A-3B, 6A-6C, 7A-7D, 8, and 9. The FBE-based communication module 508 is configured to transmit a system information signal to a UE (e.g., the UEs 115, 315, and/or 400) indicating an FBE configuration and communicate UL communications (e.g., PUCCH and/or PUSCH) and/or DL communications (e.g., PDCCH and/or PDSCH) with the UE based on the FBE configuration.

In some aspects, the system information signal may indicate either an FBE contention mode or an LBE contention mode. The FBE configuration may indicate a duration of the frame period, a duration of the gap period, a frame boundary alignment between the frame periods and radio frames. In some instances, the FBE configuration may indicate the duration of the gap period in units of symbols or slots. In some instances, the FBE-based communication module 408 is configured to compute the duration for the gap period based on the duration of the frame period and a minimum duration of the gap period with respect to the frame period. In some instances, the FBE configuration may indicate a number of symbols or slots for the gap period in addition to the minimum duration.

In some aspects, the system information signal may further indicate a physical random access channel (PRACH) configuration, and the FBE-based communication module 508 may be further configured to receive a PRACH signal from the UE based on the PRACH configuration n. In some instances, the PRACH configuration may indicate that a UE may transmit a PRACH signal during a frame period acquired by the BS 500. In some instances, the PRACH configuration may indicate that a UE may transmit a PRACH signal during any gap period based on a successful contention. In some instances, the PRACH configuration may indicate that a UE may autonomously transmit a PRACH signal during any time based on reference channel occupancy duration parameter (e.g., regulated by authority). In some instances, the PRACH configuration may indicate that a UE may contend for a frame period for transmitting a PRACH signal and may share the acquired frame period with the BS. Mechanisms for FBE communication are described in greater detail herein.

As shown, the transceiver 510 may include the modem subsystem 512 and the RF unit 514. The transceiver 510 can be configured to communicate bi-directionally with other devices, such as the UEs 115 and/or 300 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH) from the modem subsystem 512 (on outbound transmissions) or of transmissions originating from another source such as a UE 115, the UE 315, and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 215 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUCCH control information, PRACH signals, PUSCH data) to the FBE-based communication module 508 for processing. The antennas 516 may include multiple antennas of similar or different designs in order to sustain multiple transmission links.

In an example, the transceiver 510 is configured to transmit, to a UE, system information including an FBE configuration indicating a plurality of frame periods, each including a gap period for contention at the beginning of the frame period, and communicate with the UE based on the FBE configuration, for example, by coordinating with the FBE-based communication module 508.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

FIGS. 6A-6C are discussed in relation to FIGS. 7A-7D to illustrate FBE structure signaling and initial access to a network operating in an FBE-based communication mode. In FIGS. 6B and 7A-7D, the x-axes represent time in some arbitrary units.

FIG. 6A is a signaling diagram of an FBE communication method 600 according to some aspects of the present disclosure. The method 600 may be employed by a network such as the networks 100 and/or 200. In particular, the method 600 may be implemented between a BS 605 and a UE 615 communicating over the network. The BS 605 may be similar to the BSs 105 and/or 205. The UEs may be similar to the UEs 115 and/or 215. Steps of the method 600 can be executed by computing devices (e.g., a processor, processing circuit, and/or other suitable component) of the BS 605 and the UE 615. As illustrated, the method 600 includes a number of enumerated steps, but aspects of the method 600 may include additional steps before, after, and in between the enumerated steps. In some aspects, one or more of the enumerated steps may be omitted or performed in a different order. FIG. 6B is a timing diagram illustrating an FBE structure signaling scheme 640 according to some aspects of the present disclosure. The scheme 640 is described using a similar frame structure as the scheme 350, and may use the same reference numerals as in FIG. 2 for simplicity sake. FIG. 6C illustrates an exemplary system information message 630 according to some aspects of the present disclosure.

Referring to FIG. 6A, at step 620, the BS 605 transmits system information to facilitate FBE communications in a network. For instance, the BS 605 may utilize components, such as the processor 502, the FBE-based communication module 508, and the transceiver 510, to transmit the system information. The system information may include information associated with a FBE frame structure, for example, as shown in FBE frame structure 642 of FIG. 6B. The BS 605 may signal the system information using the scheme 640 discussed below.

Referring to FIG. 6B, the scheme 640 includes a plurality of radio frames 606 (shown as 606 and 606k). The radio frames 606 may be similar to the radio frames 201. In some instances, the radio frames 606 may correspond to LTE radio frames or NR radio frames. Each radio frame 606 may have a duration of about 10 milliseconds (ms) and may be associated with a sequence number beginning at 0 to N−1, where N may be any suitable integer number. In the scheme 640, the radio frames 606 may be partitioned into a plurality of frame periods 352. In the illustrated example of FIG. 6B, the BS 605 may contend for a frame period 352a. Upon winning the contention, the BS 605 transmits a SSB 650 during the frame period 352a. The SSB 650 may include a PSS, a SSS, a PBCH signal including a MIB 652. The MIB 652 may including scheduling information associated with RMSI 660. The scheduling information may indicate time and frequency resources configured for RMSI 660 transmission. The BS 605 may transmit the SSBs 650 and the RMSI 660 periodically to enable UEs (e.g., the UE 615) to synchronize to the network and/or gain initial access to the network.

The BS 605 may contend for a frame period 352b where the RMSI 660 is scheduled. Upon winning the contention, the BS 605 transmits the RMSI 660 during the frame period 352b. The RMSI 660 may include a SIB 662 including information associated with the FBE frame structure 642. For instance, the SIB 662 may include the system information message 630 of FIG. 6C. In some other instances, the MIB 652 may include the system information message 630 of FIG. 6C. In some instances, it may be desirable to include the FBE frame structure 642 in the SIB 662 as the MIB 652 may be limited to carry a certain number of parameters.

Referring to FIG. 6C, the system information message 630 includes a contention mode field 632, a frame period field 634, a frame alignment field 636, and a gap period field 638. The contention mode field 632 may indicate whether the contention mode is a LBE-based contention mode or an FBE-based contention mode. For instance, the contention mode field 632 may have length of 1 bit, where a bit-value of 0 may indicate an FBE-based contention mode and a bit-value of 1 may indicate an LBE-based contention mode. Alternatively, a bit-value of 1 may indicate an FBE-based contention mode and a bit-value of 0 may indicate an LBE-based contention mode.

The frame period field 634 indicates the duration of a frame period 352. In some aspects, each frame period 352 may have the same duration. In some aspects, the duration of a frame period 352 may be a factor of a reference duration. The reference duration may be twice the duration of a radio frame. For instance, for a 10 ms radio frame, a frame period 352 may have a duration of about 1 ms, 2 ms, 2.5 ms, 4 ms, 5 ms, 10 ms, or 20 ms. In other words, an FBE structure may have a plurality of frame periods 352 and a first frame period 352 of the plurality of frame periods 352 may align to a boundary of a radio frame. In the example where a frame period 352 has a duration of 4 ms and the reference duration is twice the duration of a radio frame, one in every five consecutive frame periods 352 may align to a radio frame. In an example, the frame period field 634 may have a length of about 3 bits, where a value of 0 may indicate a duration of 1 ms, a value of 1 may indicate a duration of 2 ms, a value of 2 may indicate a duration of 2.5 ms, a value of 3 may indicate a duration of 4 ms, a value of 4 may indicate a duration of 5 ms, a value of 5 may indicate a duration of 10 ms, and a value of 6 may indicate a duration of 20 ms. When a radio frame 606 has a duration of 10 ms, each radio frame 606 may be aligned to the start of a frame period 352 for a frame period 352 duration of 1 ms, 2 ms, 2.5 ms, 4 ms, 5 ms, or 10 ms. For a frame period 352 duration of 20 ms, every other radio frame 606 may align to the start of a frame period 352. In some other instances, the reference duration may be about 40 ms, 50 ms, 60 ms, 80 ms, 100 ms, or any suitable integer multiples of a radio frame duration.

The frame alignment field 636 indicates the alignment between the radio frames 606 and the frame periods 352. The frame alignment field 636 may indicate whether a radio frame 606 with a sequence number 0 may align to a start or an end of a gap period 354 within a frame period 352. In an aspect, the frame alignment field 636 may indicate whether a radio frame 606 with a sequence number 0 aligns to a start or an end of a gap period 354 within a first frame period 352 of a plurality of frame periods 352. In the illustrated example of FIG. 6B, the radio frame 606k may have a sequence number 0 and aligned to the start of a gap period 354. In some aspects, the inclusion of the frame alignment field 636 in the system information message 630 can be optional. For instance, the frame alignment between the radio frames 606 and the frame periods 352 can be predetermined (e.g., specified by a wireless communication protocol).

The gap period field 638 indicates the duration of a gap period 354. In some aspects, the gap period field 638 may indicate the duration of a gap period 354 in units of symbols (e.g., the symbols 206). As discussed above, the gap period 354 may be configured to satisfy a certain regulation with a minimum of 5% of a total frame period. Thus, the gap period 354 may include a minimum integer number of symbols that is greater than a minimum portion (e.g., 5%) of the frame period 352. For example, the duration of the gap period 354 can be computed as shown below:

$$N_{Symbols} = \text{round}\left(\frac{0.05 \times T_{frame\,period}}{T_{Symbol}}\right), \quad (1)$$

where $N_{symbols}$ represents the number of symbols in the gap period 354, $T_{frame\,period}$ represents the duration of a frame period 352, and $T_{symbol}$ represents the duration of a symbol. In some aspects, the minimum gap duration or the factor 5% may be configurable by the network. For instance, the factor may be 4%, 6%, or 7% or more. As an example, for a frame period 352 with a duration of about 4 ms and an SCS of about 30 kHz, the gap period 354 may include about 6 symbols. In some other instances, the gap period 354 may occupy a minimum percentage of the frame period 352 as specified by a wireless communication protocol. In some instances, the number of symbols in a gap period 354 may vary depending on the time location of the gap period 354 within a radio frame 606. For instance, in a certain configuration, the symbol time may be longer at every 0.5 ms.

In some aspects, the gap period field 638 may indicate the duration of a gap period 354 in units of slots (e.g., the slots 202). For example, the duration of the gap period 354 can be computed as shown below:

$$N_{Slots} = \text{round}\left(\frac{0.05 \times T_{frame\,period}}{T_{Slot}}\right), \quad (2)$$

where $N_{Slots}$ represents the number of slots in the gap period 354, $T_{frame\,period}$ represents the duration of a frame period 352, and $T_{Slot}$ represents the duration of a slot.

In some aspects, the gap period field 638 may be omitted from the system information message 630. In other words, the BS 605 may not signal a duration for the gap period 354. Instead, a duration of the gap period 354 can be determined based on the duration of the frame period 352. As discussed, the gap period 354 may have a duration that is at least a certain factor (e.g., about 5%) of the duration of the frame period 352. Accordingly, the UE 615 may compute the duration of the gap period 354 using the equation (1) or (2) discussed above without having the BS 605 to indicate the gap period field 638. Omitting the gap period 638 from the system information message 630 can reduce the amount of information being signaled. Further, aligning an end or a start of the gap period 354 to a radio frame boundary at every X number of frames (e.g., beginning at radio frame sequence number 0 discussed in relation to FIG. 8 below) can allow the UE 615 to determine the location of the gap period and the location of the frame period 352.

In some aspects, the gap period field 638 may indicate the number of symbols in the gap period 354 in addition to the minimum gap duration (e.g., 5% of the frame period 352). For instance, if the minimum gap duration is 6 symbols, the gap period field 638 may indicate a value of 1 for a gap period 354 of 7 symbols long. Alternatively, the gap period field 638 may indicate the number of slots in the gap period 354 in addition to the minimum gap duration (e.g., 5% of the frame period 352).

In some aspects, instead of including the system information message 630 in the RMSI 660, the BS 605 may transmit the system information message 630 in the MIB 652 instead. In general, the BS 605 may include the system information message 630 in any broadcast system information block.

In some aspects, the MIB 652 and/or the SIB 662 may further include a PRACH configuration. The PRACH configuration may indicate random access resources (e.g., time-frequency resources as shown FIG. 2) for the UE 615 to transmit a PRACH signal for initial network access. The time and frequency locations of the random access resources may also be referred to as random access occasions. The BS 605 may configure PRACH resources using various configurations as described in greater detail below in FIGS. 7A-7D.

Returning to FIG. 6A, at step 622, the UE 615 may monitor for system information from the BS 605. For instance, the UE 615 may utilize components, such as the processor 402, the FBE-based communication module 408, and the transceiver 410, to monitor for PSS and/or SSS from the BS 605, synchronize to the PSS and/or SSS, receive the PBCH signal, decode the MIB 652 to obtain the resource location of the RMSI 660 and/or the PRACH configuration, receive the RMSI 660 based on monitoring of the RMSI resource location, and decode the SIB 662 to obtain information associated with the FBE frame structure 642.

At step 624, after the obtaining information related to the FBE frame structure 642 and the PRACH configuration, the UE 615 may perform a random access procedure with the BS 605. For instance, the UE 615 may transmit a PRACH preamble (e.g., MSG1) to the BS 605 to initiate a network access. The BS 605 may respond with a MSG2. Upon receiving the MSG2, the UE 615 may transmit a MSG3 and the BS may respond with a MSG4 as described above with respect to FIG. 1. For instance, the UE 615 may utilize components, such as the processor 402, the FBE-based communication module 408, and the transceiver 410, to communicate the MSG1, MSG2, MSG2, and MSG4 with the BS 605. Alternatively, the UE 615 may use the 2-step RACH process. In any case, the UE may initiate a random access procedure by transmitting a physical preamble signal in the random access resource.

Subsequently, the BS 605 may configure the UE with PDCCH search spaces (e.g., UE-specific search spaces or GC-PDCCH search spaces) where the UE 615 may monitor for DL control information from the BS 605. As discussed above, after the BS 605 successfully acquires the frame period 352c, the BS 605 may transmit a GC-PDCCH signal 360a1 (e.g., a type-3 PDCCH) at the beginning of the frame period 352c. In some other instances, the BS 605 may transmit a SSB (e.g., the SSB 650) and/or a RMSI (e.g., a type-0 PDCCH) in the frame period 352c. The BS 605 may schedule the UE 615 for UL and/or DL communications in the frame period 352c. Thus, upon detecting a GC-PDCCH signal 360a1, the UE 615 may monitor for scheduling grants from the BS 605 during the frame period 352c.

Figure 7A:
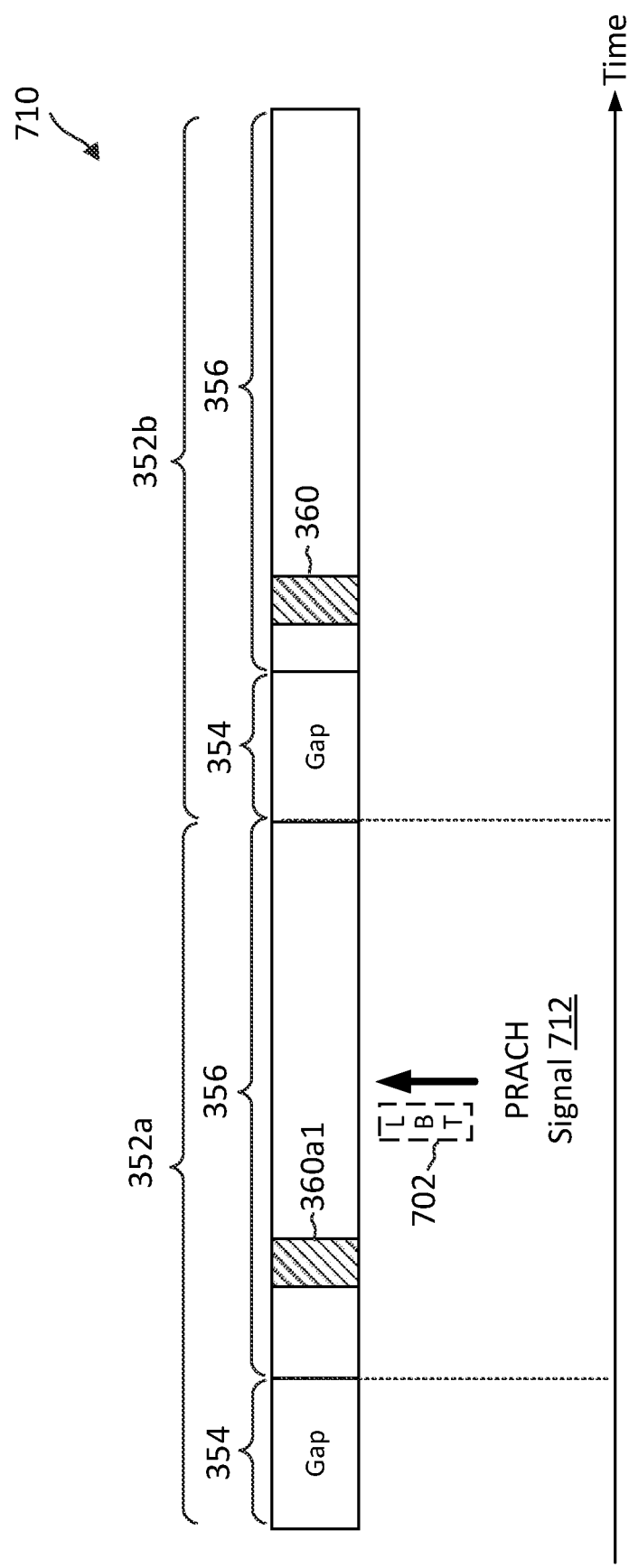
FIG. 7A is a timing diagram illustrating a physical random access channel (PRACH) configuration scheme according to some aspects of the present disclosure.

FIG. 7A is a timing diagram illustrating a PRACH configuration scheme 710 according to some aspects of the present disclosure. The scheme 710 is discussed in relation to FIGS. 6A-6C, and may use the same reference numerals as in FIGS. 2 and 6A-6C for simplicity sake. The BS 605 may indicate a PRACH configuration as shown in the scheme 710. The scheme 710 configures the UE 615 to transmit a PRACH signal within the serving BS 605 acquired frame period 352. In other words, the random access resources are located within a non-gap duration of the serving BS 605 acquired frame period 352. For instance, the BS 605 successfully acquires the frame period 352a. When the configured random access resources are located within the BS 605 acquired frame period 352a, the UE 615 may transmit a PRACH signal 712 (e.g., a preamble sequence) during the transmission period 356 of the BS 605 acquired frame period 352a) using the configured random access resources. The UE can optionally perform an LBT 702 during the non-gap duration of the BS 605 acquired frame period 352a and transmit the PRACH signal 712 after passing the LBT 702. The LBT 702 may be a one-shot LBT without a random backoff. Performing LBT 702 by the UE 615 can avoid hidden-node issue. For example, a node nearby the UE 615 may not be detected by the BS 605 when the BS 605 performs an LBT in the gap period 354, but can be impacted by a transmission from the UE 615. The BS 605 may fail to acquire the frame period 352b, and thus the UE 615 may not transmit a PRACH signal 712 in the frame period 352b.

In order to enable the UE 615 to transmit a PRACH signal 712 within the serving BS 605's acquired frame period 352, the BS 605 may include GC-PDCCH search space information (e.g., time-frequency resource information) in the RMSI 660 (e.g., in the SIB 662), transmit a GC-PDCCH signal 360a1 in a non-gap duration of a frame period 352 acquired by the BS 605. The UE 615 may determine that a frame period 352 is acquired by the BS 605 based on a detection of the GC-PDCCH signal 360a1. In the context of NR, the UE 615 may monitor for type-3 PDCCH. Alternatively, the UE 615 may determine whether the BS 605 has acquired a certain frame period 352 based on a detection of a SSB of the BS 605 in the frame period 352. In the context of NR the UE 615 may monitor for type-0 PDCCH.

Figure 7B:
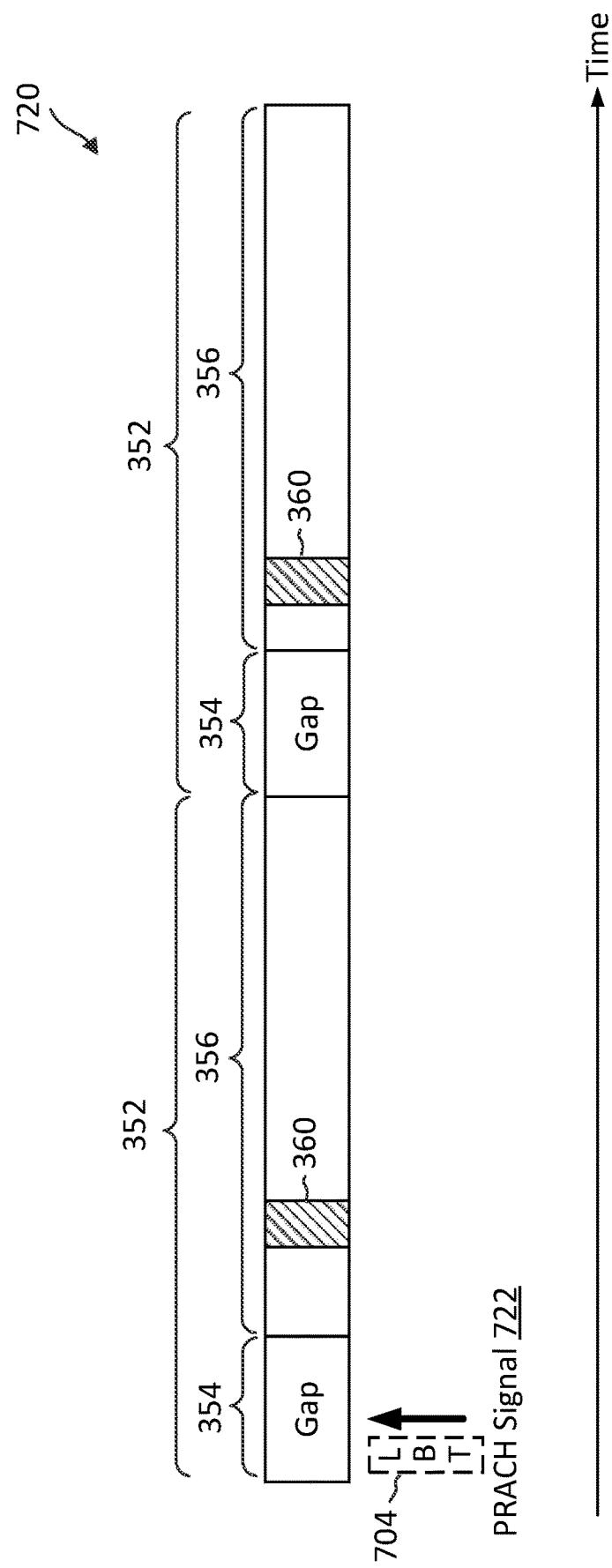
FIG. 7B is a timing diagram illustrating a PRACH configuration scheme according to some aspects of the present disclosure.

FIG. 7B is a timing diagram illustrating a PRACH configuration scheme 720 according to some aspects of the present disclosure. The scheme 720 is discussed in relation to FIGS. 6A-6C, and may use the same reference numerals as in FIGS. 2 and 6A-6C for simplicity sake. The BS 605 may indicate a PRACH configuration as shown in the scheme 720. The scheme 720 configures the UE 615 to transmit a PRACH signal during any gap period 354 based on a successful contention (e.g., passing an LBT). In other words, the random access resources are located within the gap periods 354. For instance, the UE 615 may perform an LBT 704 prior to transmitting a PRACH signal 722 (e.g., the PRACH signal 712) in a gap period 354. In some instances, the LBT 704 may include a random backoff and a variable contention window size (e.g., similar to a category 4 LBT). Configuring random access resources in the gap periods 354 can be desirable as the UE 615 may transmit a PRACH signal 722 in any gap period 354 (e.g., after a successful LBT) instead of having to wait for the BS to successfully acquire a frame period 352, and thus network access latency can be reduced.

Figure 7C:
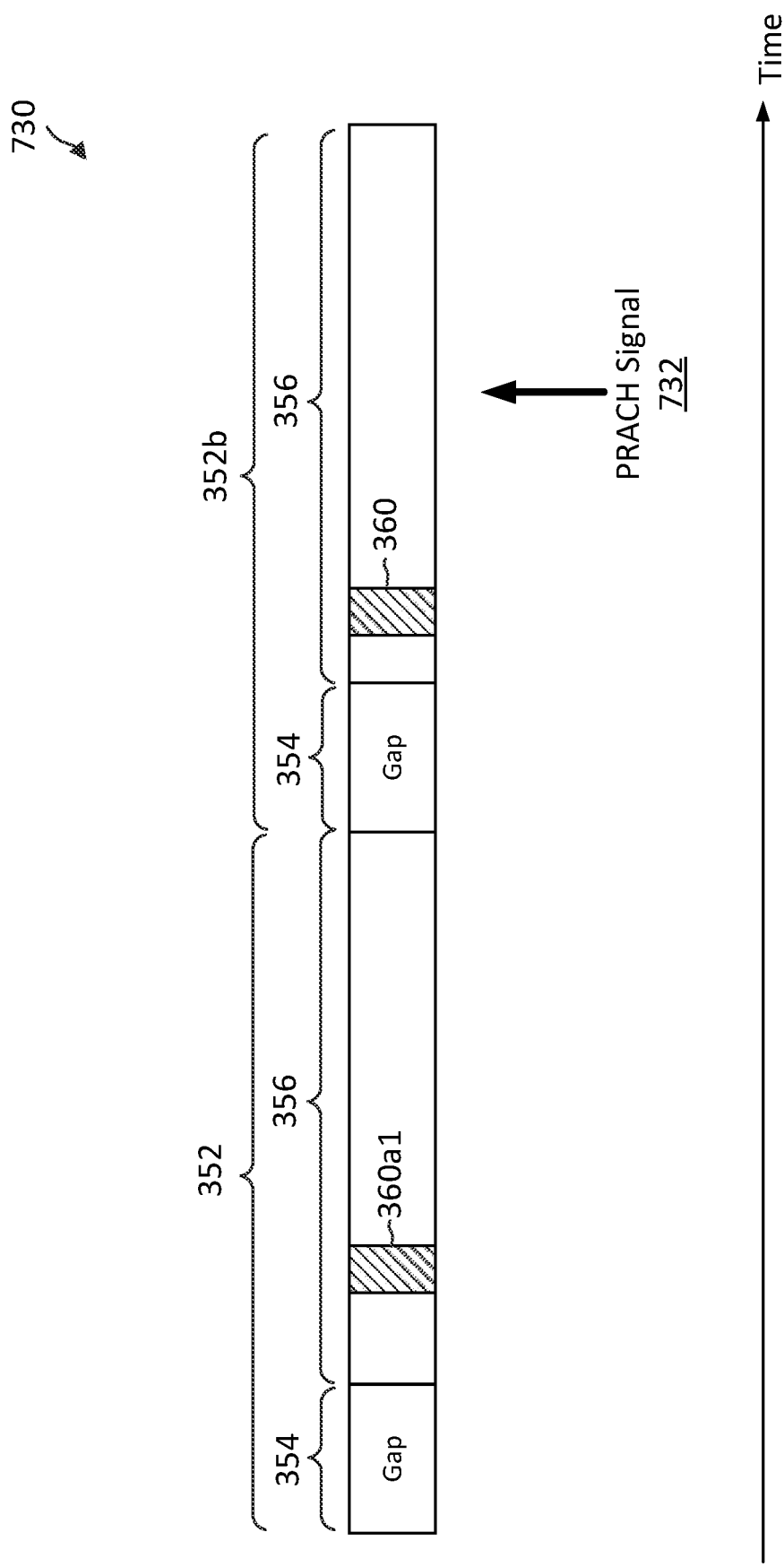
FIG. 7C is a timing diagram illustrating a PRACH configuration scheme according to some aspects of the present disclosure.

FIG. 7C is a timing diagram illustrating a PRACH configuration scheme 730 according to some aspects of the present disclosure. The scheme 730 is discussed in relation to FIGS. 6A-6C, and may use the same reference numerals as in FIGS. 2 and 6A-6C for simplicity sake. The BS 605 may indicate a PRACH configuration as shown in the scheme 730. The scheme 730 may configure the UE 615 to transmit a PRACH signal during any time period, based on a reference channel occupancy duration parameter which may be regulated by authority for example. For instance, the scheme 730 configures the UE 615 to transmit a PRACH signal autonomously during any time period if the transmission duration is less than a certain percentage (e.g., about 5%). In other words, the UE 615 may transmit for a duration corresponding to 5% (which is an example of the reference channel occupancy duration parameter) of a certain duration if the UE 615 remains quite (e.g., no transmission) for the remaining 95% of the duration. For instance, the BS 605 may fail to acquire the frame period 352b, but the UE 615 may still transmit a PRACH signal 732 during the frame period 352b. The UE 615 may optionally perform an LBT similar to the LBT 704 prior to transmitting the PRACH signal 732 and transmitting the PRACH signal 732 based on a successful LBT 704. Allowing the UE 615 to autonomously transmit a PRACH signal 732 in any time period (e.g., gap or non-gap periods) can further provide the UE 615 with more opportunities to transmit a PRACH signal, and thus may further reduce network access latency.

Figure 7D:
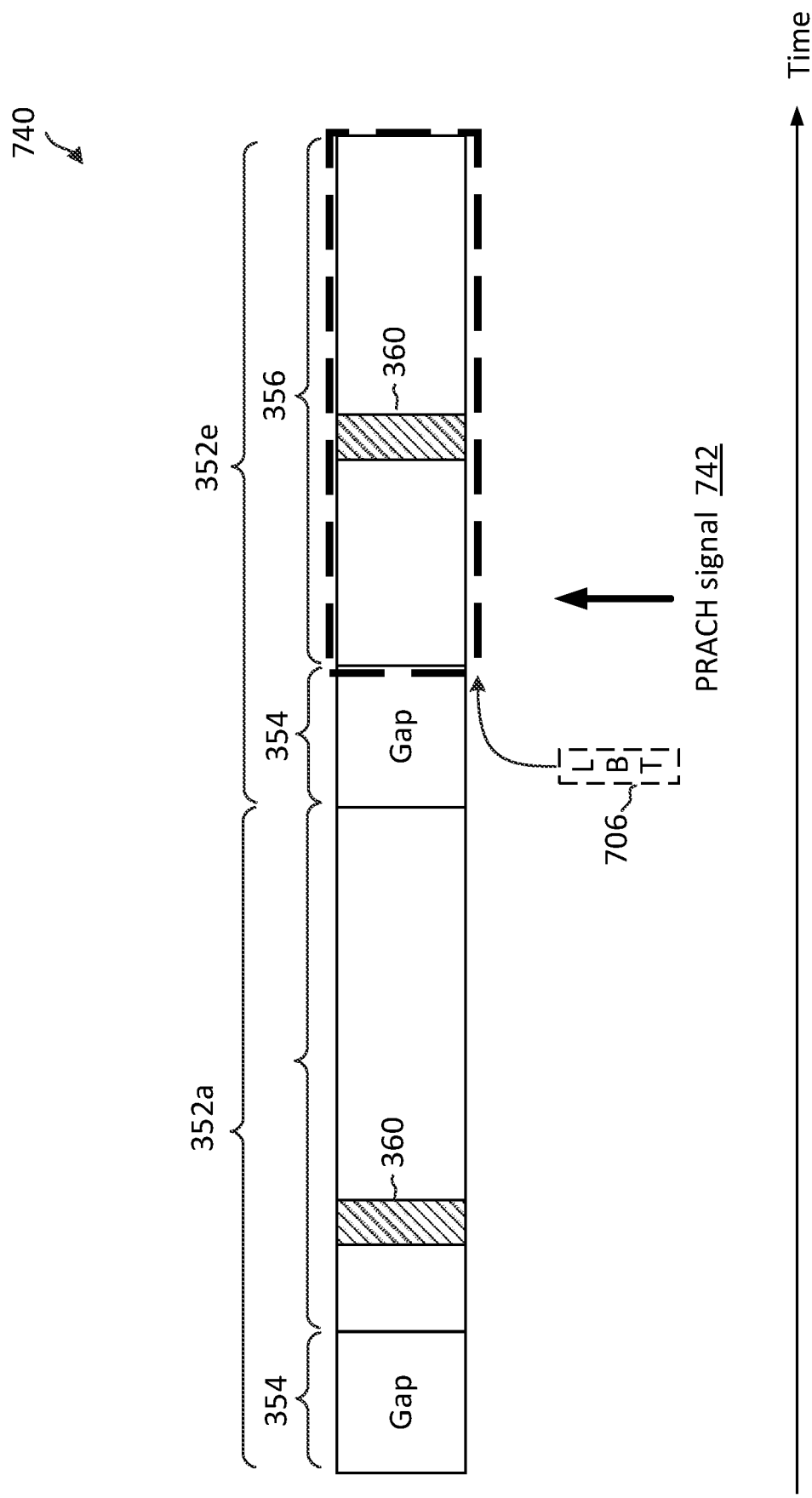
FIG. 7D is a timing diagram illustrating a PRACH configuration scheme according to some aspects of the present disclosure.

FIG. 7D is a timing diagram illustrating a PRACH configuration scheme 740 according to some aspects of the present disclosure. The scheme 740 is discussed in relation to FIGS. 6A-6C, and may use the same reference numerals as in FIGS. 2 and 6A-6C for simplicity sake. The BS 605 may indicate a PRACH configuration as shown in the scheme 740. In the scheme 740, the UE 615 may contend for a frame period 352e during a corresponding gap period 354, for example, by performing an LBT 706. The LBT 706 may include a random backoff and a variable contention window size. If the UE 615 wins the contention, the UE 615 may transmit a PRACH signal 742 within a transmission period 356 of the UE 615-acquired frame period 352e. Additionally, the UE 615 may share the UE 615-acquired frame period 352e with the BS 605. As shown, the BS 605 transmits a DL communication 360 during a portion of the transmission period 356 of the UE 615-acquired frame period 352e. Since the PRACH signal 742 may occupy a small fraction of the frame period 352e (as shown in FIG. 7D), sharing the UE 615-acquired frame period 352e with the BS 605 can leaving the spectrum unused during the remaining time (after the PRACH signal 742), and thus may improve spectrum utilization efficiency.

Figure 8:
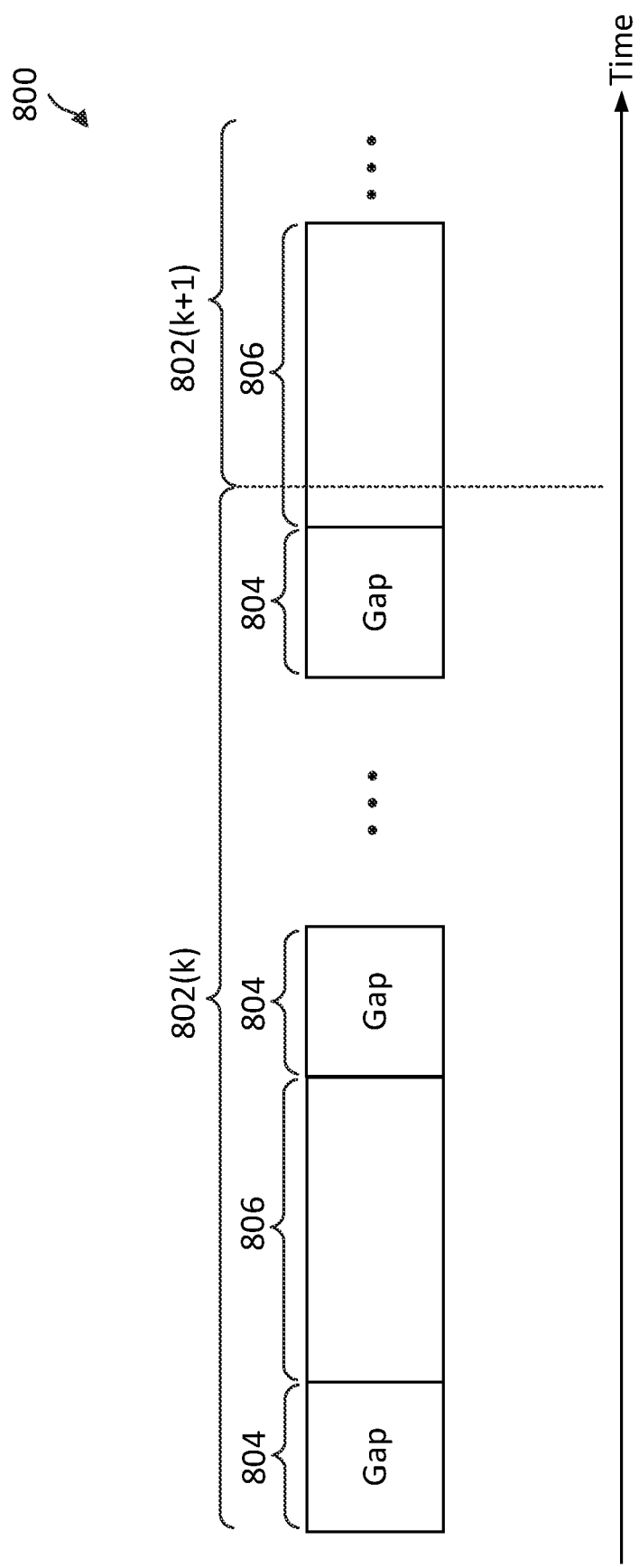
FIG. 8 is a timing diagram illustrating an FBE configuration scheme according to some aspects of the present disclosure.

FIG. 8 is a timing diagram illustrating an FBE configuration scheme 800 according to some aspects of the present disclosure. The scheme 800 may be employed by a network such as the networks 100 and/or 200. In the scheme 800, the frame period 806 may exclude a gap period 804. Instead, each frame period 806 is followed by a gap period 804, where contention is performed. For instance, a BS (e.g., the BSs 105, 305, and/or 605) may contend for a frame period 806 in a corresponding contention period 804 preceding the frame period 806. After a successful contention, the BS may communicate with a UE during the frame period 806 using any suitable mechanisms discussed above with reference to FIGS. 2, 3A-3B, 6A-6C, and 7A-7D.

In some instances, the total duration of a gap period 804 and a frame period 806 may not be an integer factor of a multiple of radio frame 802. For instance, the radio frame 802 has a duration of about 10 ms, the frame period 806 may have a duration of about 10 ms, and the gap period 804 may have a duration of about 0.5 ms. The radio frame 802k (e.g., with a sequence number of 0) may be aligned to the start of a frame period 806 as shown. Since the total duration of the gap period 804 and the frame period 806 is 10.5 ms, which is not a factor of 20 ms, the radio frames 802 may align to the start of a frame period 806 at every 21 radio frames 802. In general, the frame period 806 boundary and the radio frame 802 boundary may align once in every X radio frames, where X is a lowest common multiple (LCM) of the radio frame duration and the total frame and gap duration. In some instances, it may be desirable to set X to a value of 2 so that the frame periods 806 may align to a radio frame at every 20 ms to ease scheduling (e.g., to match the transmission period or periodicity of SSBs, which is default to 20 ms in 5G) while providing flexibility in selecting a duration (which may be 1 ms, 2 ms, 2.5 ms, 4 ms, 5 ms, or 10 ms as discussed above in relation to FIG. 6C) for a frame period 806.

In some aspects, the frame alignment can be predetermined, for example, specified by a wireless communication protocol. For instance, the wireless communication protocol may specify that the frame alignment may begin at radio frame 802 with a sequence number 0. Alternatively, the BS may signal a radio frame offset in a frame alignment field (e.g., the frame alignment field 636) of an FBE structure message (e.g., the system information message 630). The radio frame offset may correspond to the sequence number of a radio frame 802 that aligns to the start of a frame period 806. For instance, the frame alignment field may have a value of 5 to signal that the radio frame 802 with a sequence number 5 is aligned to the start of a frame period 806. In other words, referring to the example where the radio frames 802 may align to the start of a frame period 806 at every 21 radio frames 802, the next alignment may occur at the radio frame 806 with a sequence number 26.

Figure 9:
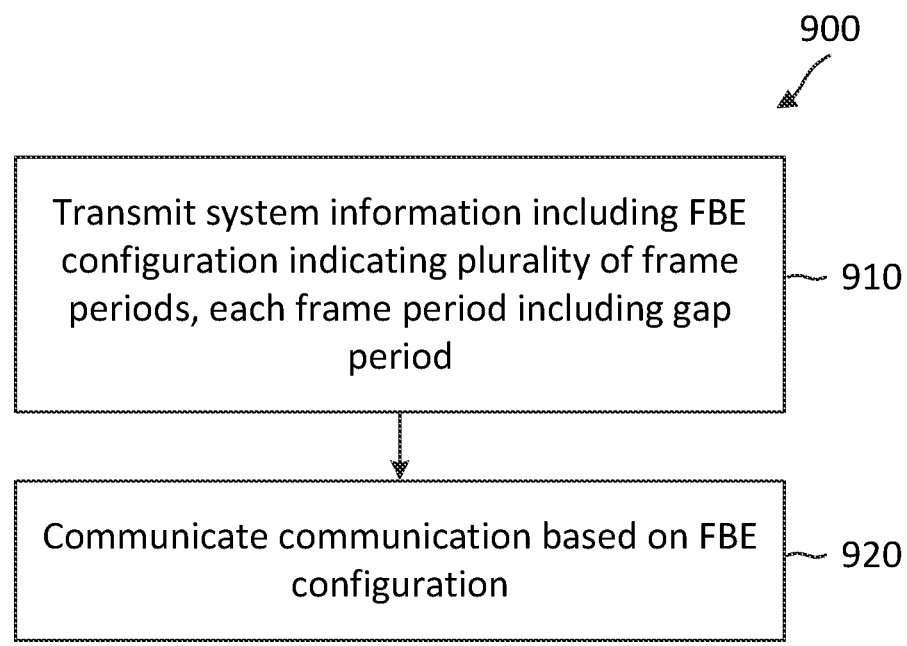
FIG. 9 is a flow diagram of a communication method according to some aspects of the present disclosure.

FIG. 9 is a flow diagram of a communication method 900 according to some aspects of the present disclosure. Steps of the method 900 can be executed by a computing device (e.g., a processor, processing circuit, and/or other suitable component) of an apparatus or other suitable means for performing the steps. For example, a BS, such as the BSs 105, 305, 500, and/or 605, may utilize one or more components, such as the processor 502, the memory 504, the FBE-based communication module 508, the transceiver 510, and the one or more antennas 516, to execute the steps of method 900. The method 900 may employ similar mechanisms as in the method 600 described above with respect to FIG. 6A and/or the schemes 640, 710, 720, 730, 740, and/or 800 described above with respect to FIGS. 6B, 7A, 7B, 7C, 7D, and/or 8, respectively. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, the BS transmits system information including an FBE configuration indicating a plurality of frame periods (e.g., the frame periods 352), where each frame period of the plurality of frame periods includes a gap period (e.g., the gap period 354). For instance, the BS may utilize components, such as the processor 502, the memory 504, the FBE-based communication module 508, the transceiver 510, and the one or more antennas 516, to transmit the system information including the FBE configuration indicating the plurality of frame periods.

At block 920, the BS communicates, with a UE (e.g. the UEs 115, 315, 400, and/or 615), a communication based on the FBE configuration. For instance, the BS may utilize components, such as the processor 502, the memory 504, the FBE-based communication module 508, the transceiver 510, and the one or more antennas 516, to communicate with the UE based on the FBE configuration.

In some aspects, the system information, discussed with reference to block 910, is transmitted in a PBCH signal. In some aspects, the system information, discussed with reference to block 910, is transmitted in a RMSI signal. In some instances, it may be desirable to transmit the system information including the FBE configuration in the RMSI signal instead of in a MIB (or PBCH signal) since the MIB may be limited to carry a certain number of parameters.

In some aspects, the system information, discussed with reference to block 910, may be similar to the message 630 of FIG. 6C. In some instances, the system information, discussed with reference to block 910, indicates either an FBE mode or an LBE mode. In some instances, the FBE configuration, discussed with reference to block 910, indicates a duration of each frame period. In some instances, the duration is an integer factor of a radio frame duration. In some instances, the duration is an integer factor of twice a radio frame duration. In some instances, the FBE configuration, discussed with reference to block 910, indicates that a beginning of a radio frame is aligned to a start or an end of the gap period of a first frame period of the plurality of frame periods. In some instances, the FBE configuration, discussed with reference to block 910, indicates a duration of the gap period in units of symbols. In some instances, the FBE configuration, discussed with reference to block 910, indicates a duration of the gap period in units of slots. In some instances, the FBE configuration, discussed with reference to block 910, indicates at least one of a number of symbols or a number of slots in the gap period that is in addition to a reference duration of the gap period.

In some aspects, the BS further determines at least one of a number of symbols or a number of slots for the gap period based on at least one of a duration of a first frame period of the plurality of frame periods or a gap duration parameter (e.g., a factor of the first frame period). For instance, the BS may utilize components, such as the processor 502, the memory 504, the FBE-based communication module 508, the transceiver 510, and the one or more antennas 516, to determine the at least one of the number of symbols or the number of slots for the gap period, for example, based on Equation (1) and/or (2) shown above.

In some aspects, the FBE configuration, discussed with reference to block 910, includes a PRACH configuration for transmitting a PRACH signal. The BS further transmits, to the UE, an indication during a first frame period of the plurality of frame periods based on a successful contention in a corresponding gap period. The BS further receives, from the UE, the PRACH signal during the first frame period at the block 920. In some instances, the indication includes at least one of a GC-PDCCH signal, a SSB signal, or a type-0 PDCCH signal. The SSB signal is a broadcast signal and can be monitored by all UEs. The type-0 PDCCH signal may be monitored by UEs that had successfully decoded the SSB signal. The GC-PDCCH signal may be monitored by a group of UEs that are configured with a GC-PDCCH monitoring configuration. The UE can be aware of the BS successfully acquiring a frame period via various signaling. In some instances, the system information, discussed with reference to block 910, includes a GC-PDCCH monitoring configuration.

In some aspects, the FBE configuration, discussed with reference to block 910, includes a PRACH configuration for transmitting a PRACH signal during any gap period within the plurality of frame periods based on a successful contention, for example, as shown in the scheme 720. In some aspects, the FBE configuration, discussed with reference to block 910, includes a PRACH configuration for transmitting a PRACH signal during any period within the plurality of frame periods based on a reference channel occupancy duration parameter, for example, as shown in the scheme 730. In some aspects, the FBE configuration, discussed with reference to block 910, includes a PRACH configuration for transmitting a PRACH signal during a first frame period acquired by the UE of the plurality of frame periods, for example, as shown in the scheme 740. In some aspects, at the block 920, the BS further receives, from the UE, the PRACH signal during the first frame period acquired by the UE and transmits, to the UE, a DL communication during the first frame period acquired by the UE.

Figure 10:
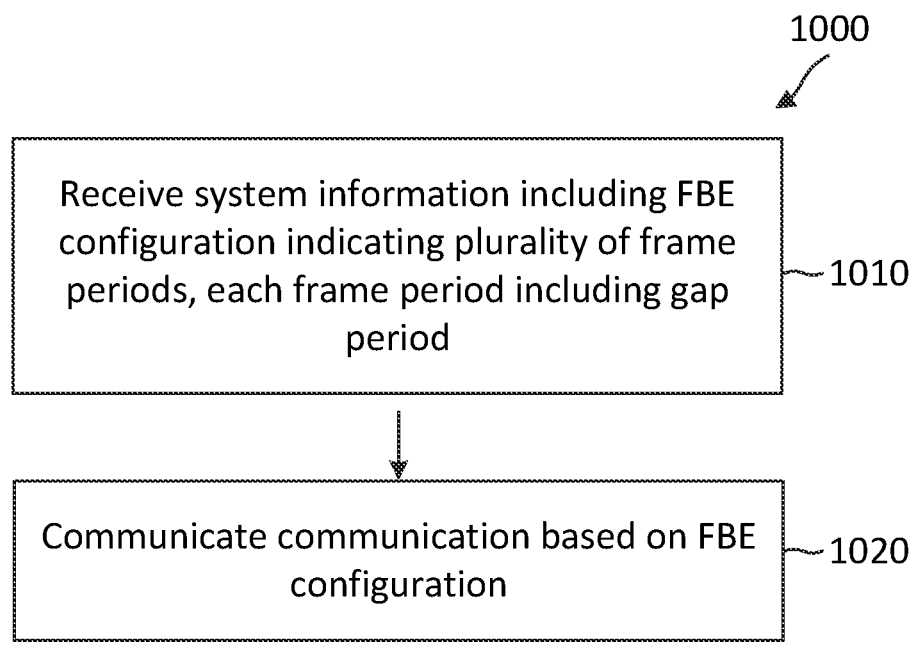
FIG. 10 is a flow diagram of a communication method according to some aspects of the present disclosure.

FIG. 10 is a flow diagram of a communication method 1000 according to some aspects of the present disclosure. Steps of the method 1000 can be executed by a computing device (e.g., a processor, processing circuit, and/or other suitable component) of an apparatus or other suitable means for performing the steps. For example, a UE, such as the UEs 115, 315, 400, and/or 615, may utilize one or more components, such as the processor 402, the memory 404, the FBE-based communication module 408, the transceiver 410, and the one or more antennas 416, to execute the steps of method 1000. The method 1000 may employ similar mechanisms as in the method 600 described above with respect to FIG. 6A and/or the schemes 640, 710, 720, 730, 740, and/or 800 described above with respect to FIG. 6B, 7A, 7B, 7C, 7D, and/or 8, respectively. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the UE receives, from a BS (e.g., the BSs 105, 305, 500, and/or 605), system information including an FBE configuration indicating a plurality of frame periods (e.g., the frame periods 352), where each frame period of the plurality of frame periods includes a gap period (e.g., the gap period 354). For instance, the UE may utilize components, such as the processor 402, the memory 404, the FBE-based communication module 408, the transceiver 410, and the one or more antennas 416, to receive the system information including the FBE configuration indicating the plurality of frame periods.

At block 1020, the UE communicates, with the BS, a communication based on the FBE configuration. For instance, the UE may utilize components, such as the processor 402, the memory 404, the FBE-based communication module 408, the transceiver 410, and the one or more antennas 416, to communicate with the BS based on the FBE configuration.

In some aspects, the system information, discussed with reference to block 1010, is transmitted in a PBCH signal. In some aspects, the system information, discussed with reference to block 1010, is transmitted in a RMSI signal.

In some aspects, the system information, discussed with reference to block 1010, may be similar to the message 630 of FIG. 6C. In some instances, the system information, discussed with reference to block 1010, indicates either an FBE mode or an LBE mode. In some instances, the FBE configuration, discussed with reference to block 1010, indicates a duration of each frame period. In some instances, the duration is an integer factor of a radio frame duration. In some instances, the duration is an integer factor of twice a radio frame duration. In some instances, the FBE configuration, discussed with reference to block 1010, indicates that a beginning of a radio frame is aligned to a start or an end of the gap period of a first frame period of the plurality of frame periods. In some instances, the FBE configuration, discussed with reference to block 1010, indicates a duration of the gap period in units of symbols. In some instances, the FBE configuration, discussed with reference to block 1010, indicates a duration of the gap period in units of slots. In some instances, the FBE configuration, discussed with reference to block 1010, indicates at least one of a number of symbols or a number of slots in the gap period that is in addition to a reference duration of the gap period.

In some aspects, the UE further determines at least one of a number of symbols or a number of slots for the gap period based on at least one of a duration of a first frame period of the plurality of frame periods or a gap duration parameter (e.g., a factor of the first frame period). For instance, the UE may utilize components, such as the processor 402, the memory 404, the FBE-based communication module 408, the transceiver 410, and the one or more antennas 416, to determine the at least one of the number of symbols or the number of slots for the gap period, for example, based on Equation (1) and/or (2) shown above.

In some aspects, the FBE configuration, discussed with reference to block 1010, includes a PRACH configuration for transmitting a PRACH signal. The UE further receives, from the BS, an indication during a first frame period of the plurality of frame periods based on a successful contention in a corresponding gap period. The UE further transmits, to the UE, the PRACH signal during the first frame period at the block 1020. In some instances, the indication includes at least one of a GC-PDCCH signal, a SSB signal, or a type-0 PDCCH signal. In some instances, the system information, discussed with reference to block 1010, includes a GC-PDCCH monitoring configuration.

In some aspects, the FBE configuration, discussed with reference to block 1010, includes a PRACH configuration for transmitting a PRACH signal during any gap period within the plurality of frame periods based on a successful contention, for example, as shown in the scheme 720. In some aspects, the FBE configuration, discussed with reference to block 1010, includes a PRACH configuration for transmitting a PRACH signal during any period within the plurality of frame periods based on a reference channel occupancy duration parameter, for example, as shown in the scheme 730. In some aspects, the FBE configuration, discussed with reference to block 1010, includes a PRACH configuration for transmitting a PRACH signal during a first frame period acquired by the UE of the plurality of frame periods, for example, as shown in the scheme 740. In some aspects, at the block 1020, the UE further transmits, to the BS, the PRACH signal during the first frame period acquired by the UE and receives, from the BS, a DL communication during the first frame period acquired by the UE.

Further aspects of the present disclosure include a non-transitory computer-readable medium having program code recorded thereon. The non-transitory computer-readable medium includes code for causing a base station (BS) to transmit system information including a frame based equipment (FBE) configuration indicating a plurality of frame periods, each frame period of the plurality of frame periods including a gap period at a beginning of the frame period. The non-transitory computer-readable medium also includes code for causing the BS to communicate, with a UE, a communication based on the FBE configuration.

The non-transitory computer-readable medium may also include one or more of the following features. For instance, the non-transitory computer-readable medium includes where the code for causing the BS to transmit the system information is configured to transmit, to the UE, a physical broadcast channel (PBCH) signal including the FBE configuration. The code for causing the BS to transmit the system information is configured to transmit, to the UE, a remaining system information (RMSI) signal including the FBE configuration. The system information indicates either an FBE mode or a load based equipment (LBE) mode. The FBE configuration indicates a duration of each frame period. The duration is an integer factor of a radio frame duration. The duration is an integer factor of twice a radio frame duration. The FBE configuration indicates that a beginning of a radio frame is aligned to a start or an end of the gap period of a first frame period of the plurality of frame periods. The FBE configuration indicates a duration of the gap period in units of symbols. The FBE configuration indicates a duration of the gap period in units of slots. The non-transitory computer-readable medium may include code for causing the BS to determine at least one of a number of symbols or a number of slots for the gap period based on at least one of a duration of a first frame period of the plurality of frame periods or a gap duration parameter. The FBE configuration indicates at least one of a number of symbols or a number of slots in the gap period that is in addition to a reference duration of the gap period. The FBE configuration includes a physical random access channel (PRACH) configuration for transmitting a PRACH signal; the program code further includes code for causing the BS to transmit, to the UE, an indication during a first frame period of the plurality of frame periods based on a successful contention in a corresponding gap period; and the code for causing the BS to communicate the communication is configured to receive, from the UE, the PRACH signal during the first frame period. The code for causing the BS to transmit the indication is configured to transmit, to the UE, at least one of a group common-physical downlink control channel (GC-PDCCH) signal, a SSB signal, or a type-0 PDCCH signal during the first frame period. The system information includes a GC-PDCCH monitoring configuration. The FBE configuration includes a physical random access channel (PRACH) configuration for transmitting a PRACH signal during any gap period within the plurality of frame periods based on a successful contention. The FBE configuration includes a physical random access channel (PRACH) configuration for transmitting a PRACH signal during any period within the plurality of frame periods based on a reference channel occupancy duration parameter. The FBE configuration includes a physical random access channel (PRACH) configuration for transmitting a PRACH signal during a first frame period acquired by the UE of the plurality of frame periods. The code for causing the BS to communicate the communication is configured to receive, from the UE, the PRACH signal during the first frame period acquired by the UE; and transmit, to the UE, a downlink (DL) communication during the first frame period acquired by the UE.

Further aspects of the present disclosure include a non-transitory computer-readable medium having program code recorded thereon. The non-transitory computer-readable medium includes code for causing a user equipment (UE) to receive, from a base station (BS), system information including a frame based equipment (FBE) configuration indicating a plurality of frame periods, each frame period of the plurality of frame periods including a gap period at a beginning of the frame period; and code for causing the UE to communicate, with the BS, a communication based on the FBE configuration.

The non-transitory computer-readable medium may also include one or more of the following features. For instance, the non-transitory computer-readable medium includes where the code for causing the UE to receive the system information is configured to receive, from the BS, a physical broadcast channel (PBCH) signal including the FBE configuration. The code for causing the UE to receive the system information is configured to receive, from the BS, a remaining system information (RMSI) signal including the FBE configuration. The system information indicates either an FBE mode or a load based equipment (LBE) mode. The FBE configuration indicates a duration of each frame period. The duration is an integer factor of a radio frame duration. The duration is an integer factor of twice a radio frame duration. The FBE configuration indicates that a beginning of a radio frame is aligned to a start or an end of the gap period of a first frame period of the plurality of frame periods. The FBE configuration indicates a duration of the gap period in units of symbols. The FBE configuration indicates a duration of the gap period in units of slots. The non-transitory computer-readable medium may include code for causing the UE to determine at least one of a number of symbols or a number of slots for the gap period based on at least one of a duration of a first frame period of the plurality of frame periods or a gap duration parameter. The FBE configuration indicates at least one of a number of symbols or a number of slots in the gap period that is in addition to a reference duration of the gap period. The FBE configuration includes a physical random access channel (PRACH) configuration for transmitting a PRACH signal; the program code further includes code for causing the UE to receive, from the BS, an indication during a first frame period of the plurality of frame periods based on a successful contention in a corresponding gap period; and the code for causing the UE to communicate the communication is configured to transmit, to the BS, the PRACH signal during the first frame period. The code for causing the UE to receive the indication is configured to receive, from the BS, at least one of a group common-physical downlink control channel (GC-PDCCH) signal, a SSB signal, or a type-0 PDCCH signal during the first frame period. The system information includes a GC-PDCCH monitoring configuration, and where the code for causing the UE to receive the indication is configured to receive, from the BS, the GC-PDCCH signal based on the GC-PDCCH monitoring configuration. The FBE configuration includes a physical random access channel (PRACH) configuration for transmitting a PRACH signal during any gap period within the plurality of frame periods based on a successful contention. The FBE configuration includes a physical random access channel (PRACH) configuration for transmitting a PRACH signal during any period within the plurality of frame periods based on a reference channel occupancy duration parameter. The FBE configuration includes a physical random access channel (PRACH) configuration for transmitting a PRACH signal during a first frame period acquired by the UE of the plurality of frame periods. The code for causing the UE to communicate the communication is configured to transmit, to the BS, the PRACH signal during the first frame period acquired by the UE; and receive, from the BS, a downlink (DL) communication during the first frame period acquired by the UE.

Further aspects of the present disclosure include a base station (BS). The base station includes means for transmitting system information including a frame based equipment (FBE) configuration indicating a plurality of frame periods, each frame period of the plurality of frame periods including a gap period at a beginning of the frame period. The base station also includes means for communicating, with a UE, a communication based on the FBE configuration.

The BS may also include one or more of the following features. For instance, the BS includes where the means for transmitting the system information is configured to transmit, to the UE, a physical broadcast channel (PBCH) signal including the FBE configuration. The means for transmitting the system information is configured to transmit, to the UE, a remaining system information (RMSI) signal including the FBE configuration. The system information indicates either an FBE mode or a load based equipment (LBE) mode. The FBE configuration indicates a duration of each frame period. The duration is an integer factor of a radio frame duration. The duration is an integer factor of twice a radio frame duration. The FBE configuration indicates that a beginning of a radio frame is aligned to a start or an end of the gap period of a first frame period of the plurality of frame periods. The FBE configuration indicates a duration of the gap period in units of symbols. The FBE configuration indicates a duration of the gap period in units of slots. The BS may include means for determining at least one of a number of symbols or a number of slots for the gap period based on at least one of a duration of a first frame period of the plurality of frame periods or a gap duration parameter. The FBE configuration indicates at least one of a number of symbols or a number of slots in the gap period that is in addition to a reference duration of the gap period. The FBE configuration includes a physical random access channel (PRACH) configuration for transmitting a PRACH signal; the BS further includes means for transmitting, to the UE, an indication during a first frame period of the plurality of frame periods based on a successful contention in a corresponding gap period; and the means for communicating the communication is configured to receive, from the UE, the PRACH signal during the first frame period. The means for transmitting the indication is configured to transmit, to the UE, at least one of a group common-physical downlink control channel (GC-PDCCH) signal, a SSB signal, or a type-0 PDCCH signal during the first frame period. The system information includes a GC-PDCCH monitoring configuration. The FBE configuration includes a physical random access channel (PRACH) configuration for transmitting a PRACH signal during any gap period within the plurality of frame periods based on a successful contention. The FBE configuration includes a physical random access channel (PRACH) configuration for transmitting a PRACH signal during any period within the plurality of frame periods based on a reference channel occupancy duration parameter. The FBE configuration includes a physical random access channel (PRACH) configuration for transmitting a PRACH signal during a first frame period acquired by the UE of the plurality of frame periods. The means for communicating the communication is configured to receive, from the UE, the PRACH signal during the first frame period acquired by the UE; and transmit, to the UE, a downlink (DL) communication during the first frame period acquired by the UE.

Further aspects of the present disclosure include a user equipment (UE). The user equipment includes means for receiving, from a base station (BS), system information including a frame based equipment (FBE) configuration indicating a plurality of frame periods, each frame period of the plurality of frame periods including a gap period at a beginning of the frame period; and means for communicating, with the BS, a communication based on the FBE configuration.

The UE may also include one or more of the following features. For instance, the UE includes where the means for receiving the system information is configured to receive, from the BS, a physical broadcast channel (PBCH) signal including the FBE configuration. The means for receiving the system information is configured to receive, from the BS, a remaining system information (RMSI) signal including the FBE configuration. The system information indicates either an FBE mode or a load based equipment (LBE) mode. The FBE configuration indicates a duration of each frame period. The duration is an integer factor of a radio frame duration. The duration is an integer factor of twice a radio frame duration. The FBE configuration indicates that a beginning of a radio frame is aligned to a start or an end of the gap period of a first frame period of the plurality of frame periods. The FBE configuration indicates a duration of the gap period in units of symbols. The FBE configuration indicates a duration of the gap period in units of slots. The UE may include means for determine at least one of a number of symbols or a number of slots for the gap period based on at least one of a duration of a first frame period of the plurality of frame periods or a gap duration parameter. The FBE configuration indicates at least one of a number of symbols or a number of slots in the gap period that is in addition to a reference duration of the gap period. The FBE configuration includes a physical random access channel (PRACH) configuration for receiving a PRACH signal; the UE further includes means for receiving, from the BS, an indication during a first frame period of the plurality of frame periods based on a successful contention in a corresponding gap period; and the means for communicating the communication is configured to transmit, to the BS, the PRACH signal during the first frame period. The means for receiving the indication is configured to receive, from the BS, at least one of a group common-physical downlink control channel (GC-PDCCH) signal, a SSB signal, or a type-0 PDCCH signal during the first frame period. The system information includes a GC-PDCCH monitoring configuration, and where the means for receiving the indication is configured to receive, from the BS, the GC-PDCCH signal based on the GC-PDCCH monitoring configuration. The FBE configuration includes a physical random access channel (PRACH) configuration for transmitting a PRACH signal during any gap period within the plurality of frame periods based on a successful contention. The FBE configuration includes a physical random access channel (PRACH) configuration for transmitting a PRACH signal during any period within the plurality of frame periods based on a reference channel occupancy duration parameter. The FBE configuration includes a physical random access channel (PRACH) configuration for transmitting a PRACH signal during a first frame period acquired by the UE of the plurality of frame periods. The means for communicating the communication is configured to transmit, to the BS, the PRACH signal during the first frame period acquired by the UE; and receive, from the BS, a downlink (DL) communication during the first frame period acquired by the UE.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
receiving, from a base station (BS), system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and
communicating, with the BS, a communication based on the FBE configuration.

2. The method of claim 1, wherein the system information indicates either an FBE mode or a load based equipment (LBE) mode.

3. The method of claim 1, wherein the FBE configuration indicates a duration of each frame period.

4. The method of claim 3, wherein the duration of each frame period is an integer factor of twice a radio frame duration.

5. The method of claim 3, wherein the duration of each frame period is a factor of 20 milliseconds.

6. The method of claim 1, wherein the FBE configuration indicates a duration of the gap period in units of symbols.

7. The method of claim 1, wherein the FBE configuration indicates a duration of the gap period in units of slots.

8. The method of claim 1, further comprising:
determining, at least one of a number of symbols or a number of slots for the gap period based on a duration of a first frame period of the plurality of frame periods.

9. The method of claim 1, wherein the FBE configuration indicates at least one of a number of symbols or a number of slots in the gap period that is in addition to a reference duration of the gap period.

10. The method of claim 1, wherein:
the FBE configuration includes a physical random access channel (PRACH) configuration for transmitting a PRACH signal;
the method further comprises:
receiving, from the BS, an indication during a first frame period of the plurality of frame periods based on a successful contention in a corresponding gap period; and
the communicating includes:
transmitting, to the BS, the PRACH signal during the first frame period.

11. The method of claim 10, wherein the receiving the indication includes:
receiving, by the UE from the BS, at least one of a group common-physical downlink control channel (GC-PDCCH) signal, a SSB signal, or a type-0 PDCCH signal during the first frame period.

12. The method of claim 11, wherein the system information includes a GC-PDCCH monitoring configuration, and wherein the receiving the indication includes:
receiving, from the BS, the GC-PDCCH signal based on the GC-PDCCH monitoring configuration.

13. The method of claim 1, wherein the FBE configuration includes a physical random access channel (PRACH) configuration for transmitting a PRACH signal during any gap period within the plurality of frame periods based on a successful contention.

14. The method of claim 1, wherein the FBE configuration includes a physical random access channel (PRACH) configuration for transmitting a PRACH signal during any period within the plurality of frame periods based on a reference channel occupancy duration parameter.

15. The method of claim 1, wherein the FBE configuration includes a physical random access channel (PRACH) configuration for transmitting a PRACH signal during a first frame period acquired by the UE of the plurality of frame periods.

16. The method of claim 15, wherein the communicating includes:
   transmitting, to the BS, the PRACH signal during the first frame period acquired by the UE; and
   receiving, from the BS, a downlink (DL) communication during the first frame period acquired by the UE.

17. A method of wireless communication performed by a base station (BS), the method comprising:
   transmitting, system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and
   communicating, with a UE, a communication based on the FBE configuration.

18. The method of claim 17, wherein the system information indicates either an FBE mode or a load based equipment (LBE) mode.

19. The method of claim 17, wherein the FBE configuration indicates a duration of each frame period.

20. The method of claim 19, wherein the duration of each frame period is an integer factor of twice a radio frame duration.

21. The method of claim 19, wherein the duration of each frame period is a factor of 20 milliseconds.

22. The method of claim 17, wherein the FBE configuration indicates a duration of the gap period in units of symbols.

23. The method of claim 17, wherein the FBE configuration indicates a duration of the gap period in units of slots.

24. The method of claim 17, further comprising:
   determining at least one of a number of symbols or a number of slots for the gap period based on a duration of a first frame period of the plurality of frame periods.

25. The method of claim 17, wherein the FBE configuration indicates at least one of a number of symbols or a number of slots in the gap period that is in addition to a reference duration of the gap period.

26. The method of claim 17, wherein:
   the FBE configuration includes a physical random access channel (PRACH) configuration for transmitting a PRACH signal;
   the method further comprises:
      transmitting, to the UE, an indication during a first frame period of the plurality of frame periods based on a successful contention in a corresponding gap period; and
   the communicating includes:
      receiving, from the UE, the PRACH signal during the first frame period.

27. The method of claim 26, wherein the transmitting the indication includes:
   transmitting, to the UE, at least one of a group common-physical downlink control channel (GC-PDCCH) signal, a SSB signal, or a type-0 PDCCH signal during the first frame period.

28. The method of claim 27, wherein the system information includes a GC-PDCCH monitoring configuration.

29. The method of claim 17, wherein the FBE configuration includes a physical random access channel (PRACH) configuration for transmitting a PRACH signal during any gap period within the plurality of frame periods based on a successful contention.

30. The method of claim 17, wherein the FBE configuration includes a physical random access channel (PRACH) configuration for transmitting a PRACH signal during any period within the plurality of frame periods based on a reference channel occupancy duration parameter.

31. The method of claim 17, wherein the FBE configuration includes a physical random access channel (PRACH) configuration for transmitting a PRACH signal during a first frame period acquired by the UE of the plurality of frame periods.

32. The method of claim 31, wherein the communicating includes:
   receiving, from the UE, the PRACH signal during the first frame period acquired by the UE; and
   transmitting, to the UE, a downlink (DL) communication during the first frame period acquired by the UE.

33. A user equipment (UE) comprising:
   a memory;
   a transceiver; and
   at least one processor coupled to the memory and the transceiver, wherein the UE is configured to:
      receive, from a base station (BS), system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and
      communicate, with the BS, a communication based on the FBE configuration.

34. The UE of claim 33, wherein the system information indicates either an FBE mode or a load based equipment (LBE) mode.

35. The UE of claim 33, wherein the FBE configuration indicates a duration of each frame period.

36. The UE of claim 35, wherein the duration of each frame period is an integer factor of twice a radio frame duration.

37. The UE of claim 35, wherein the duration of each frame period is a factor of 20 milliseconds.

38. The UE of claim 33, wherein the FBE configuration indicates a duration of the gap period in units of symbols.

39. The UE of claim 33, wherein the FBE configuration indicates a duration of the gap period in units of slots.

40. The UE of claim 33, wherein the UE is further configured to:
   determine at least one of a number of symbols or a number of slots for the gap period based on a duration of a first frame period of the plurality of frame periods.

41. The UE of claim 33, wherein the FBE configuration indicates at least one of a number of symbols or a number of slots in the gap period that is in addition to a reference duration of the gap period.

42. The UE of claim 33, wherein:
   the FBE configuration includes a physical random access channel (PRACH) configuration for transmitting a PRACH signal;
   the UE is further configured to:
      receive, from the BS, an indication during a first frame period of the plurality of frame periods based on a successful contention in a corresponding gap period; and transmit, to the BS, the PRACH signal during the first frame period.

43. The UE of claim 42, wherein the UE is further configured to:
receive, from the BS, at least one of a group common-physical downlink control channel (GC-PDCCH) signal, a SSB signal, or a type-0 PDCCH signal during the first frame period.

44. The UE of claim 43, wherein the system information includes a GC-PDCCH monitoring configuration, and wherein the UE is further configured to:
receive, from the BS, the GC-PDCCH signal based on the GC-PDCCH monitoring configuration.

45. The UE of claim 33, wherein the FBE configuration includes a physical random access channel (PRACH) configuration for transmitting a PRACH signal during any gap period within the plurality of frame periods based on a successful contention.

46. The UE of claim 33, wherein the FBE configuration includes a physical random access channel (PRACH) configuration for transmitting a PRACH signal during any period within the plurality of frame periods based on a reference channel occupancy duration parameter.

47. The UE of claim 33, wherein the FBE configuration includes a physical random access channel (PRACH) configuration for transmitting a PRACH signal during a first frame period acquired by the UE of the plurality of frame periods.

48. The UE of claim 47, wherein the UE is further configured to:
transmit, to the BS, the PRACH signal during the first frame period acquired by the UE; and
receive, from the BS, a downlink (DL) communication during the first frame period acquired by the UE.

49. A base station (BS) comprising:
a memory;
a transceiver; and
at least one processor coupled to the memory and the transceiver, wherein the BS is configured to:
transmit system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and
communicate, with a UE, a communication based on the FBE configuration.

50. The BS of claim 49, wherein the system information indicates either an FBE mode or a load based equipment (LBE) mode.

51. The BS of claim 49, wherein the FBE configuration indicates a duration of each frame period.

52. The BS of claim 51, wherein the duration of each frame period is an integer factor of twice a radio frame duration.

53. The BS of claim 51, wherein the duration of each frame period is a factor of 20 milliseconds.

54. The BS of claim 49, wherein the FBE configuration indicates a duration of the gap period in units of symbols.

55. The BS of claim 49, wherein the FBE configuration indicates a duration of the gap period in units of slots.

56. The BS of claim 49, wherein the BS is further configured to:
determine at least one of a number of symbols or a number of slots for the gap period based on a duration of a first frame period of the plurality of frame periods.

57. The BS of claim 49, wherein the FBE configuration indicates at least one of a number of symbols or a number of slots in the gap period that is in addition to a reference duration of the gap period.

58. The BS of claim 49, wherein:
the FBE configuration includes a physical random access channel (PRACH) configuration for transmitting a PRACH signal;
the BS is further configured to:
transmit, to the UE, an indication during a first frame period of the plurality of frame periods based on a successful contention in a corresponding gap period; and
receive, from the UE, the PRACH signal during the first frame period.

59. The BS of claim 58, wherein the BS is further configured to:
transmit, to the UE, at least one of a group common-physical downlink control channel (GC-PDCCH) signal, a SSB signal, or a type-0 PDCCH signal during the first frame period.

60. The BS of claim 59, wherein the system information includes a GC-PDCCH monitoring configuration.

61. The BS of claim 49, wherein the FBE configuration includes a physical random access channel (PRACH) configuration for transmitting a PRACH signal during any gap period within the plurality of frame periods based on a successful contention.

62. The BS of claim 49, wherein the FBE configuration includes a physical random access channel (PRACH) configuration for transmitting a PRACH signal during any period within the plurality of frame periods based on a reference channel occupancy duration parameter.

63. The BS of claim 49, wherein the FBE configuration includes a physical random access channel (PRACH) configuration for transmitting a PRACH signal during a first frame period acquired by the UE of the plurality of frame periods.

64. The BS of claim 63, the BS is further configured to:
receive, from the UE, the PRACH signal during the first frame period acquired by the UE; and
transmit, to the UE, a downlink (DL) communication during the first frame period acquired by the UE.

65. A user equipment (UE) comprising:
means for receiving, from a base station (BS), system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and
means for communicating, with the BS, a communication based on the FBE configuration.

66. A base station (BS) comprising:
means for transmitting system information including a frame based equipment (FBE) configuration indicating a plurality of frame periods, each frame period of the plurality of frame periods including a gap period, wherein a start or an end of the gap period of a first frame period of the plurality of frame periods is aligned to a beginning of a radio frame; and
means for communicating, with a UE, a communication based on the FBE configuration.

* * * * *